US009292179B2

(12) United States Patent
Svendsen et al.

(10) Patent No.: US 9,292,179 B2
(45) Date of Patent: *Mar. 22, 2016

(54) SYSTEM AND METHOD FOR IDENTIFYING MUSIC CONTENT IN A P2P REAL TIME RECOMMENDATION NETWORK

(71) Applicant: Napo Enterprises, LLC, Wilmington, DE (US)

(72) Inventors: Hugh B. Svendsen, Chapel Hill, NC (US); Michael Erickson, Raleigh, NC (US)

(73) Assignee: Napo Enterprises, LLC, Wilmington, DE (US)

( * ) Notice: Subject to any disclaimer, the term of this patent is extended or adjusted under 35 U.S.C. 154(b) by 383 days.

This patent is subject to a terminal disclaimer.

(21) Appl. No.: 13/852,553

(22) Filed: Mar. 28, 2013

(65) Prior Publication Data

US 2013/0219274 A1    Aug. 22, 2013

Related U.S. Application Data

(63) Continuation of application No. 12/911,778, filed on Oct. 26, 2010, now Pat. No. 8,422,490, which is a continuation of application No. 11/609,948, filed on Dec. 13, 2006, now Pat. No. 8,059,646, which is a continuation-in-part of application No. 11/484,130, filed on Jul. 11, 2006, now Pat. No. 7,680,959.

(51) Int. Cl.
*H04L 12/28* (2006.01)
*G06F 3/0484* (2013.01)
(Continued)

(52) U.S. Cl.
CPC ........ *G06F 3/0484* (2013.01); *G06F 17/30743* (2013.01); *G06F 17/30749* (2013.01);
(Continued)

(58) Field of Classification Search
USPC ................... 370/386, 252, 329, 390; 709/248
See application file for complete search history.

(56) References Cited

U.S. PATENT DOCUMENTS

| 4,870,579 A | 9/1989 | Hey |
| 5,621,456 A | 4/1997 | Florin et al. |

(Continued)

FOREIGN PATENT DOCUMENTS

| CN | 1208930 | 2/1999 |
| CN | 1614931 | 5/2005 |

(Continued)

OTHER PUBLICATIONS

Kosugi, Naoko et al., "A Practical Query-By-Humming System for a Large Music Database,"Proceedings of the 8th ACM International Conference on Multimedia, Oct. 30-Nov. 3, 2000, Los Angeles, California, copyright 2000, ACM, pp. 333-342.

(Continued)

*Primary Examiner* — John Pezzlo

(57) ABSTRACT

A method for media recommendations is provided, including storing, on a peer device, a pre-existing list of media presentations including a plurality of pre-existing media presentations. A plurality of media recommendations are received from a plurality of recommending peer devices in response to a media presentation being played. Each of the plurality of media recommendations comprises an identifier that identifies a recommended media presentation. Each recommended media presentation is automatically added to the list of media presentations in a position determined based user preferences to form an updated list of media presentations. Based on the position of each of the media presentations, a media presentation is selected to play on the peer device from the updated list of media presentations. The selected media presentation is then played on the peer device.

20 Claims, 18 Drawing Sheets

(51) Int. Cl.
*G06F 17/30* (2006.01)
*G06Q 10/10* (2012.01)
*G06Q 30/02* (2012.01)
*H04L 12/00* (2006.01)
*H04L 29/00* (2006.01)
*H04N 7/00* (2011.01)
*H04N 7/16* (2011.01)
*H04N 21/466* (2011.01)
*H04N 21/4788* (2011.01)
*H04N 21/482* (2011.01)
*H04N 21/81* (2011.01)
*H04J 1/16* (2006.01)
*H04L 29/08* (2006.01)

(52) U.S. Cl.
CPC .... *G06F17/30758* (2013.01); *G06F 17/30766* (2013.01); *G06F 17/30867* (2013.01); *G06Q 10/10* (2013.01); *G06Q 30/02* (2013.01); *H04L 12/00* (2013.01); *H04L 29/00* (2013.01); *H04N 7/00* (2013.01); *H04N 7/163* (2013.01); *H04N 21/4661* (2013.01); *H04N 21/4668* (2013.01); *H04N 21/4788* (2013.01); *H04N 21/4825* (2013.01); *H04N 21/4826* (2013.01); *H04N 21/8113* (2013.01); *H04L 67/104* (2013.01)

(56) References Cited

U.S. PATENT DOCUMENTS

| | | | |
|---|---|---|---|
| 5,724,567 | A | 3/1998 | Rose et al. |
| 5,771,778 | A | 6/1998 | MacLean, IV |
| 5,956,027 | A | 9/1999 | Krishnamurthy |
| 5,960,437 | A | 9/1999 | Krawchuk et al. |
| 5,963,916 | A | 10/1999 | Kaplan |
| 6,134,552 | A | 10/2000 | Fritz et al. |
| 6,195,657 | B1 | 2/2001 | Rucker et al. |
| 6,266,649 | B1 | 7/2001 | Linden et al. |
| 6,314,420 | B1 | 11/2001 | Lang et al. |
| 6,317,722 | B1 | 11/2001 | Jacobi et al. |
| 6,353,823 | B1 | 3/2002 | Kumar |
| 6,388,714 | B1 | 5/2002 | Schein et al. |
| 6,438,579 | B1 | 8/2002 | Hosken |
| 6,438,759 | B1 | 8/2002 | Jaunault et al. |
| 6,498,955 | B1 | 12/2002 | McCarthy et al. |
| 6,526,411 | B1 | 2/2003 | Ward |
| 6,567,797 | B1 | 5/2003 | Schuetze et al. |
| 6,587,127 | B1 | 7/2003 | Leeke et al. |
| 6,587,850 | B2 | 7/2003 | Zhai |
| 6,609,253 | B1 | 8/2003 | Swix et al. |
| 6,615,208 | B1 | 9/2003 | Behrens et al. |
| 6,629,104 | B1 | 9/2003 | Parulski et al. |
| 6,636,836 | B1 | 10/2003 | Pyo |
| 6,654,786 | B1 | 11/2003 | Fox et al. |
| 6,662,231 | B1 | 12/2003 | Drosset et al. |
| 6,670,537 | B2 | 12/2003 | Hughes et al. |
| 6,694,482 | B1 | 2/2004 | Arellano et al. |
| 6,754,904 | B1 | 6/2004 | Cooper et al. |
| 6,757,517 | B2 | 6/2004 | Chang |
| 6,757,691 | B1 | 6/2004 | Welsh et al. |
| 6,801,909 | B2 | 10/2004 | Delgado et al. |
| 6,865,565 | B2 | 3/2005 | Rainsberger et al. |
| 6,904,264 | B1 | 6/2005 | Frantz |
| 6,912,528 | B2 | 6/2005 | Homer |
| 6,941,275 | B1 | 9/2005 | Swierczek |
| 6,941,324 | B2 | 9/2005 | Plastina et al. |
| 6,947,922 | B1 | 9/2005 | Glance |
| 6,973,475 | B2 | 12/2005 | Kenyon et al. |
| 6,976,228 | B2 | 12/2005 | Bernhardson |
| 6,986,136 | B2 | 1/2006 | Simpson et al. |
| 6,987,221 | B2 | 1/2006 | Platt |
| 6,990,453 | B2 | 1/2006 | Wang et al. |
| 7,013,301 | B2 | 3/2006 | Holm et al. |
| 7,035,871 | B2 | 4/2006 | Hunt et al. |
| 7,047,406 | B2 | 5/2006 | Schleicher et al. |
| 7,072,846 | B1 | 7/2006 | Robinson |
| 7,072,886 | B2 | 7/2006 | Salmenkaita et al. |
| 7,075,000 | B2 | 7/2006 | Gang et al. |
| 7,076,553 | B2 | 7/2006 | Chan et al. |
| 7,085,747 | B2 | 8/2006 | Schaffer et al. |
| 7,089,248 | B1 | 8/2006 | King et al. |
| 7,096,234 | B2 | 8/2006 | Plastina et al. |
| 7,120,619 | B2 | 10/2006 | Drucker et al. |
| 7,139,757 | B1 | 11/2006 | Apollonsky et al. |
| 7,145,678 | B2 | 12/2006 | Simpson et al. |
| 7,146,627 | B1 | 12/2006 | Ismail et al. |
| 7,171,174 | B2 | 1/2007 | Ellis et al. |
| 7,177,872 | B2 | 2/2007 | Schwesig et al. |
| 7,219,145 | B2 | 5/2007 | Chmaytelli et al. |
| 7,222,187 | B2 | 5/2007 | Yeager et al. |
| 7,240,358 | B2 | 7/2007 | Horn et al. |
| 7,277,955 | B2 | 10/2007 | Elliott |
| 7,283,992 | B2 | 10/2007 | Liu et al. |
| 7,296,032 | B1 | 11/2007 | Beddow |
| 7,305,449 | B2 | 12/2007 | Simpson et al. |
| 7,340,481 | B1 | 3/2008 | Baer et al. |
| 7,356,187 | B2 | 4/2008 | Shanahan et al. |
| 7,437,364 | B1 | 10/2008 | Fredricksen et al. |
| 7,441,041 | B2 | 10/2008 | Williams et al. |
| 7,444,339 | B2 | 10/2008 | Matsuda et al. |
| 7,457,790 | B2 | 11/2008 | Kochunni et al. |
| 7,463,890 | B2 | 12/2008 | Herz et al. |
| 7,469,283 | B2 | 12/2008 | Eyal et al. |
| 7,496,623 | B2 | 2/2009 | Szeto et al. |
| 7,509,291 | B2 | 3/2009 | McBride et al. |
| 7,512,658 | B2 | 3/2009 | Brown et al. |
| 7,523,156 | B2 | 4/2009 | Giacalone, Jr. |
| 7,548,915 | B2 | 6/2009 | Ramer et al. |
| 7,590,546 | B2 | 9/2009 | Chuang |
| 7,594,246 | B1 | 9/2009 | Billmaier et al. |
| 7,614,006 | B2 | 11/2009 | Molander |
| 7,623,843 | B2 | 11/2009 | Squibbs |
| 7,627,644 | B2 | 12/2009 | Slack-Smith |
| 7,644,166 | B2 | 1/2010 | Appelman et al. |
| 7,653,654 | B1 | 1/2010 | Sundaresan |
| 7,676,753 | B2 | 3/2010 | Bedingfield |
| 7,680,959 | B2 | 3/2010 | Svendsen |
| 7,720,871 | B2 | 5/2010 | Rogers et al. |
| 7,725,494 | B2 | 5/2010 | Rogers et al. |
| 7,734,569 | B2 | 6/2010 | Martin et al. |
| 7,761,399 | B2 | 7/2010 | Evans |
| 7,765,192 | B2 | 7/2010 | Svendsen |
| 7,805,129 | B1 | 9/2010 | Issa et al. |
| 7,827,110 | B1 | 11/2010 | Wieder |
| 7,877,387 | B2 | 1/2011 | Hangartner |
| 7,970,922 | B2 | 6/2011 | Svendsen |
| 8,059,646 | B2 | 11/2011 | Svendsen et al. |
| 2001/0013009 | A1 | 8/2001 | Greening et al. |
| 2001/0021914 | A1 | 9/2001 | Jacobi et al. |
| 2001/0025259 | A1 | 9/2001 | Rouchon |
| 2002/0052207 | A1 | 5/2002 | Hunzinger |
| 2002/0052674 | A1 | 5/2002 | Chang et al. |
| 2002/0052873 | A1 | 5/2002 | Delgado et al. |
| 2002/0082901 | A1 | 6/2002 | Dunning et al. |
| 2002/0087382 | A1 | 7/2002 | Tiburcio |
| 2002/0103796 | A1 | 8/2002 | Hartley |
| 2002/0108112 | A1 | 8/2002 | Wallace et al. |
| 2002/0116533 | A1 | 8/2002 | Holliman et al. |
| 2002/0138836 | A1 | 9/2002 | Zimmerman |
| 2002/0165793 | A1 | 11/2002 | Brand et al. |
| 2002/0178057 | A1 | 11/2002 | Bertram et al. |
| 2002/0194325 | A1 | 12/2002 | Chmaytelli et al. |
| 2002/0194356 | A1 | 12/2002 | Chan et al. |
| 2003/0001907 | A1 | 1/2003 | Bergsten et al. |
| 2003/0005074 | A1 | 1/2003 | Herz et al. |
| 2003/0014407 | A1 | 1/2003 | Blatter et al. |
| 2003/0018799 | A1 | 1/2003 | Eyal |
| 2003/0046399 | A1 | 3/2003 | Boulter et al. |
| 2003/0055516 | A1 | 3/2003 | Gang et al. |
| 2003/0055657 | A1 | 3/2003 | Yoshida et al. |
| 2003/0066068 | A1 | 4/2003 | Gutta et al. |
| 2003/0069806 | A1 | 4/2003 | Konomi et al. |
| 2003/0084044 | A1 | 5/2003 | Simpson et al. |
| 2003/0084086 | A1 | 5/2003 | Simpson et al. |

(56) References Cited

U.S. PATENT DOCUMENTS

| | | |
|---|---|---|
| 2003/0084151 A1 | 5/2003 | Simpson et al. |
| 2003/0089218 A1 | 5/2003 | Gang et al. |
| 2003/0097186 A1 | 5/2003 | Gutta et al. |
| 2003/0115167 A1 | 6/2003 | Sharif et al. |
| 2003/0135513 A1 | 7/2003 | Quinn et al. |
| 2003/0137531 A1 | 7/2003 | Katinsky et al. |
| 2003/0149581 A1 | 8/2003 | Chaudhri et al. |
| 2003/0149612 A1 | 8/2003 | Berghofer et al. |
| 2003/0153338 A1 | 8/2003 | Herz et al. |
| 2003/0160770 A1 | 8/2003 | Zimmerman |
| 2003/0191753 A1 | 10/2003 | Hoch |
| 2003/0227478 A1 | 12/2003 | Chatfield |
| 2003/0229537 A1 | 12/2003 | Dunning et al. |
| 2003/0232614 A1 | 12/2003 | Squibbs |
| 2003/0236582 A1 | 12/2003 | Zamir et al. |
| 2003/0237093 A1 | 12/2003 | Marsh |
| 2004/0003392 A1 | 1/2004 | Trajkovic et al. |
| 2004/0019497 A1 | 1/2004 | Volk et al. |
| 2004/0034441 A1 | 2/2004 | Eaton et al. |
| 2004/0073919 A1 | 4/2004 | Gutta et al. |
| 2004/0088271 A1 | 5/2004 | Cleckler et al. |
| 2004/0091235 A1 | 5/2004 | Gutta |
| 2004/0107821 A1 | 6/2004 | Alcalde et al. |
| 2004/0128286 A1 | 7/2004 | Yasushi et al. |
| 2004/0133657 A1 | 7/2004 | Smith et al. |
| 2004/0133908 A1 | 7/2004 | Smith et al. |
| 2004/0133914 A1 | 7/2004 | Smith et al. |
| 2004/0137882 A1 | 7/2004 | Forsyth |
| 2004/0162783 A1 | 8/2004 | Gross |
| 2004/0162830 A1 | 8/2004 | Shirwadkar et al. |
| 2004/0181540 A1 | 9/2004 | Jung et al. |
| 2004/0186733 A1 | 9/2004 | Loomis et al. |
| 2004/0199527 A1 | 10/2004 | Morain et al. |
| 2004/0215793 A1 | 10/2004 | Ryan et al. |
| 2004/0216108 A1 | 10/2004 | Robbin |
| 2004/0224638 A1 | 11/2004 | Fadell et al. |
| 2004/0252604 A1 | 12/2004 | Johnson et al. |
| 2004/0254911 A1 | 12/2004 | Grasso et al. |
| 2004/0260778 A1 | 12/2004 | Banister et al. |
| 2004/0267604 A1 | 12/2004 | Gross |
| 2005/0020223 A1 | 1/2005 | Ellis et al. |
| 2005/0021420 A1 | 1/2005 | Michelitsch et al. |
| 2005/0021470 A1 | 1/2005 | Martin et al. |
| 2005/0021678 A1 | 1/2005 | Simyon et al. |
| 2005/0022239 A1 | 1/2005 | Meuleman |
| 2005/0026559 A1 | 2/2005 | Khedouri |
| 2005/0038819 A1 | 2/2005 | Hicken et al. |
| 2005/0038876 A1 | 2/2005 | Chaudhuri |
| 2005/0060264 A1 | 3/2005 | Schrock et al. |
| 2005/0060350 A1 | 3/2005 | Baum et al. |
| 2005/0060666 A1 | 3/2005 | Hoshino et al. |
| 2005/0065976 A1 | 3/2005 | Holm et al. |
| 2005/0071418 A1 | 3/2005 | Kjellberg et al. |
| 2005/0091107 A1 | 4/2005 | Blum |
| 2005/0120053 A1 | 6/2005 | Watson |
| 2005/0125221 A1 | 6/2005 | Brown et al. |
| 2005/0125222 A1 | 6/2005 | Brown et al. |
| 2005/0131866 A1 | 6/2005 | Badros |
| 2005/0138198 A1 | 6/2005 | May |
| 2005/0154608 A1 | 7/2005 | Paulson et al. |
| 2005/0154764 A1 | 7/2005 | Riegler et al. |
| 2005/0154767 A1 | 7/2005 | Sako |
| 2005/0158028 A1 | 7/2005 | Koba |
| 2005/0166245 A1 | 7/2005 | Shin et al. |
| 2005/0197961 A1 | 9/2005 | Miller et al. |
| 2005/0228830 A1 | 10/2005 | Plastina et al. |
| 2005/0246391 A1 | 11/2005 | Gross |
| 2005/0251455 A1 | 11/2005 | Boesen |
| 2005/0256756 A1 | 11/2005 | Lam et al. |
| 2005/0256866 A1 | 11/2005 | Lu et al. |
| 2005/0267944 A1 | 12/2005 | Little, II |
| 2005/0278377 A1 | 12/2005 | Mirrashidi et al. |
| 2005/0278758 A1 | 12/2005 | Bodleander |
| 2005/0286546 A1 | 12/2005 | Bassoli et al. |
| 2005/0289236 A1 | 12/2005 | Hull et al. |
| 2006/0004640 A1 | 1/2006 | Swierczek |
| 2006/0004704 A1 | 1/2006 | Gross |
| 2006/0008256 A1 | 1/2006 | Khedouri et al. |
| 2006/0010167 A1 | 1/2006 | Grace et al. |
| 2006/0015378 A1 | 1/2006 | Mirrashidi et al. |
| 2006/0020662 A1 | 1/2006 | Robinson |
| 2006/0026048 A1 | 2/2006 | Kolawa et al. |
| 2006/0048059 A1 | 3/2006 | Etkin |
| 2006/0053080 A1 | 3/2006 | Edmonson et al. |
| 2006/0064716 A1 | 3/2006 | Sull et al. |
| 2006/0074750 A1 | 4/2006 | Clark et al. |
| 2006/0083119 A1 | 4/2006 | Hayes |
| 2006/0085349 A1 | 4/2006 | Hug |
| 2006/0085383 A1 | 4/2006 | Mantle et al. |
| 2006/0095339 A1 | 5/2006 | Hayashi et al. |
| 2006/0100924 A1 | 5/2006 | Tevanian, Jr. |
| 2006/0126135 A1 | 6/2006 | Stevens et al. |
| 2006/0130120 A1 | 6/2006 | Brandyberry et al. |
| 2006/0143236 A1 | 6/2006 | Wu |
| 2006/0156242 A1 | 7/2006 | Bedingfield |
| 2006/0167576 A1 | 7/2006 | Rosenberg |
| 2006/0167991 A1 | 7/2006 | Heikes et al. |
| 2006/0173910 A1 | 8/2006 | McLaughlin |
| 2006/0174277 A1 | 8/2006 | Sezan et al. |
| 2006/0190616 A1 | 8/2006 | Mayerhofer et al. |
| 2006/0195479 A1 | 8/2006 | Spiegelman et al. |
| 2006/0195512 A1 | 8/2006 | Rogers et al. |
| 2006/0195513 A1 | 8/2006 | Rogers et al. |
| 2006/0195514 A1 | 8/2006 | Rogers et al. |
| 2006/0195515 A1 | 8/2006 | Beaupre et al. |
| 2006/0195516 A1 | 8/2006 | Beaupre |
| 2006/0195521 A1 | 8/2006 | New et al. |
| 2006/0195789 A1 | 8/2006 | Rogers et al. |
| 2006/0195790 A1 | 8/2006 | Beaupre et al. |
| 2006/0200432 A1 | 9/2006 | Flinn et al. |
| 2006/0200435 A1 | 9/2006 | Flinn et al. |
| 2006/0206582 A1 | 9/2006 | Finn |
| 2006/0218187 A1 | 9/2006 | Plastina et al. |
| 2006/0224757 A1 | 10/2006 | Fang et al. |
| 2006/0227673 A1 | 10/2006 | Yamashita et al. |
| 2006/0242201 A1 | 10/2006 | Cobb et al. |
| 2006/0242206 A1 | 10/2006 | Brezak et al. |
| 2006/0247980 A1 | 11/2006 | Mirrashidi et al. |
| 2006/0248209 A1 | 11/2006 | Chiu et al. |
| 2006/0253417 A1 | 11/2006 | Brownrigg et al. |
| 2006/0259355 A1 | 11/2006 | Farouki et al. |
| 2006/0265409 A1 | 11/2006 | Neumann et al. |
| 2006/0265503 A1 | 11/2006 | Jones et al. |
| 2006/0265637 A1 | 11/2006 | Marriott et al. |
| 2006/0271959 A1 | 11/2006 | Jacoby et al. |
| 2006/0271961 A1 | 11/2006 | Jacoby et al. |
| 2006/0273155 A1 | 12/2006 | Thackson |
| 2006/0277098 A1 | 12/2006 | Chung et al. |
| 2006/0282304 A1 | 12/2006 | Bedard et al. |
| 2006/0282776 A1 | 12/2006 | Farmer et al. |
| 2006/0282856 A1 | 12/2006 | Errico et al. |
| 2006/0288041 A1 | 12/2006 | Plastina et al. |
| 2006/0288074 A1 | 12/2006 | Rosenberg |
| 2006/0293909 A1 | 12/2006 | Miyajima et al. |
| 2007/0005793 A1 | 1/2007 | Miyoshi et al. |
| 2007/0008927 A1 | 1/2007 | Herz et al. |
| 2007/0014536 A1 | 1/2007 | Hellman |
| 2007/0022437 A1 | 1/2007 | Gerken |
| 2007/0028171 A1 | 2/2007 | MacLaurin |
| 2007/0033292 A1 | 2/2007 | Sull et al. |
| 2007/0043766 A1 | 2/2007 | Nicholas et al. |
| 2007/0044010 A1 | 2/2007 | Sull et al. |
| 2007/0064626 A1 | 3/2007 | Evans |
| 2007/0078714 A1 | 4/2007 | Ott, IV et al. |
| 2007/0078832 A1 | 4/2007 | Ott, IV et al. |
| 2007/0079352 A1 | 4/2007 | Klein, Jr. |
| 2007/0083471 A1 | 4/2007 | Robbin et al. |
| 2007/0083553 A1 | 4/2007 | Minor |
| 2007/0083929 A1 | 4/2007 | Sprosts et al. |
| 2007/0094081 A1 | 4/2007 | Yruski et al. |
| 2007/0094082 A1 | 4/2007 | Yruski et al. |
| 2007/0094083 A1 | 4/2007 | Yruski et al. |
| 2007/0094363 A1 | 4/2007 | Yruski et al. |
| 2007/0100904 A1 | 5/2007 | Casey et al. |

(56) References Cited

U.S. PATENT DOCUMENTS

| | | |
|---|---|---|
| 2007/0104138 A1 | 5/2007 | Rudolf et al. |
| 2007/0106672 A1 | 5/2007 | Sighart et al. |
| 2007/0106693 A1 | 5/2007 | Houh et al. |
| 2007/0118425 A1 | 5/2007 | Yruski et al. |
| 2007/0118657 A1 | 5/2007 | Kreitzer et al. |
| 2007/0118802 A1 | 5/2007 | Gerace et al. |
| 2007/0118853 A1 | 5/2007 | Kreitzer et al. |
| 2007/0118873 A1 | 5/2007 | Houh et al. |
| 2007/0130008 A1 | 6/2007 | Brown et al. |
| 2007/0130012 A1 | 6/2007 | Yruski et al. |
| 2007/0152502 A1 | 7/2007 | Kinsey et al. |
| 2007/0162502 A1 | 7/2007 | Thomas et al. |
| 2007/0174147 A1 | 7/2007 | Klein, Jr. |
| 2007/0195373 A1 | 8/2007 | Singh |
| 2007/0198485 A1 | 8/2007 | Ramer et al. |
| 2007/0199014 A1 | 8/2007 | Clark et al. |
| 2007/0214182 A1 | 9/2007 | Rosenberg |
| 2007/0214259 A1 | 9/2007 | Ahmed et al. |
| 2007/0220081 A1 | 9/2007 | Hyman |
| 2007/0220575 A1* | 9/2007 | Cooper .............. H04N 7/1675 725/118 |
| 2007/0233736 A1 | 10/2007 | Xiong et al. |
| 2007/0233743 A1 | 10/2007 | Rosenberg |
| 2007/0238427 A1 | 10/2007 | Kraft et al. |
| 2007/0239724 A1 | 10/2007 | Ramer et al. |
| 2007/0244880 A1 | 10/2007 | Martin et al. |
| 2007/0245245 A1 | 10/2007 | Blue et al. |
| 2007/0264982 A1 | 11/2007 | Nguyen et al. |
| 2007/0265870 A1 | 11/2007 | Song et al. |
| 2007/0269169 A1 | 11/2007 | Stix et al. |
| 2007/0277202 A1 | 11/2007 | Lin et al. |
| 2007/0282949 A1 | 12/2007 | Fischer et al. |
| 2007/0288546 A1 | 12/2007 | Rosenberg |
| 2007/0299873 A1 | 12/2007 | Jones et al. |
| 2007/0299874 A1 | 12/2007 | Neumann et al. |
| 2007/0299978 A1 | 12/2007 | Neumann et al. |
| 2008/0005179 A1 | 1/2008 | Friedman et al. |
| 2008/0010372 A1 | 1/2008 | Khedouri et al. |
| 2008/0016098 A1 | 1/2008 | Frieden et al. |
| 2008/0016205 A1 | 1/2008 | Svendsen |
| 2008/0032723 A1 | 2/2008 | Rosenberg |
| 2008/0033959 A1 | 2/2008 | Jones |
| 2008/0040313 A1 | 2/2008 | Schachter |
| 2008/0046948 A1 | 2/2008 | Verosub |
| 2008/0052371 A1 | 2/2008 | Partovi et al. |
| 2008/0052630 A1 | 2/2008 | Rosenbaum |
| 2008/0059422 A1 | 3/2008 | Tenni et al. |
| 2008/0059576 A1 | 3/2008 | Liu et al. |
| 2008/0080774 A1 | 4/2008 | Jacobs et al. |
| 2008/0085769 A1 | 4/2008 | Lutnick et al. |
| 2008/0091771 A1 | 4/2008 | Allen et al. |
| 2008/0120501 A1 | 5/2008 | Jannink et al. |
| 2008/0133763 A1 | 6/2008 | Clark et al. |
| 2008/0134039 A1 | 6/2008 | Fischer et al. |
| 2008/0134043 A1 | 6/2008 | Georgis et al. |
| 2008/0134053 A1 | 6/2008 | Fischer |
| 2008/0141136 A1 | 6/2008 | Ozzie et al. |
| 2008/0147482 A1 | 6/2008 | Messing et al. |
| 2008/0162435 A1 | 7/2008 | Dooms et al. |
| 2008/0195664 A1 | 8/2008 | Maharajh et al. |
| 2008/0208823 A1 | 8/2008 | Hicken |
| 2008/0209013 A1 | 8/2008 | Weel |
| 2008/0235632 A1 | 9/2008 | Holmes |
| 2008/0261516 A1 | 10/2008 | Robinson |
| 2008/0270561 A1 | 10/2008 | Tang et al. |
| 2008/0288588 A1 | 11/2008 | Andam et al. |
| 2008/0306826 A1 | 12/2008 | Kramer et al. |
| 2008/0319833 A1 | 12/2008 | Svendsen |
| 2009/0055396 A1 | 2/2009 | Svendsen et al. |
| 2009/0055759 A1 | 2/2009 | Svendsen |
| 2009/0070184 A1 | 3/2009 | Svendsen |
| 2009/0076881 A1 | 3/2009 | Svendsen |
| 2009/0077041 A1 | 3/2009 | Eyal et al. |
| 2009/0077052 A1 | 3/2009 | Farrelly |
| 2009/0077084 A1 | 3/2009 | Svendsen |
| 2009/0077220 A1 | 3/2009 | Svendsen et al. |
| 2009/0083116 A1 | 3/2009 | Svendsen |
| 2009/0083117 A1 | 3/2009 | Svendsen et al. |
| 2009/0083362 A1 | 3/2009 | Svendsen |
| 2009/0129671 A1 | 5/2009 | Hu et al. |
| 2010/0185732 A1 | 7/2010 | Hyman |
| 2011/0016483 A1 | 1/2011 | Opdycke |
| 2011/0034121 A1 | 2/2011 | Ng et al. |
| 2012/0296974 A1* | 11/2012 | Tabe .......................... 709/204 |

FOREIGN PATENT DOCUMENTS

| | | |
|---|---|---|
| EP | 898278 | 2/1999 |
| EP | 1536352 | 6/2005 |
| GB | 2372850 | 9/2002 |
| GB | 2397205 | 7/2004 |
| WO | WO 01/25947 | 4/2001 |
| WO | WO 01/84353 | 11/2001 |
| WO | WO 02/21335 | 3/2002 |
| WO | WO 2004/017178 | 2/2004 |
| WO | WO 2004/043064 | 5/2004 |
| WO | WO 2005/026916 | 3/2005 |
| WO | WO 2005/071571 | 8/2005 |
| WO | WO 2006/075032 | 7/2006 |
| WO | WO 2006/126135 | 11/2006 |

OTHER PUBLICATIONS

"About uPlayMe," at <http://www.uplayme.com/about.php>, copyright 2008, uPlayMe, Inc., 4 pages.

"Amazon.com: Online Shopping for Electronics, Apparel, Computers, Books, DVDs & m . . . ," at <http://www.amazon.com/>, copyright 1996-2007, Amazon.com, Inc., printed Oct. 26, 2007, 4 pages.

Huang, Yao-Chang et al., "An Audio Recommendation System Based on Audio Signature Description Scheme in MPEG-7 Audio," IEEE International Conference on Multimedia and Expo (ICME), Jun. 27-30, 2004, IEEE, pp. 639-642.

"Anthem—Overview," at <http://www.intercastingcorp.com/platform/anthem>, copyright 2004-2007, Intercasting Corp., printed Jan. 16, 2008, 2 pages.

"Apple—iPod + iTunes," at <http://www.apple.com/itunes/>, copyright 2007 by Paramount Pictures, printed Feb. 7, 2007, 2 pages.

"Apple—iPod classic," at <http://www.apple.com/ipodclassic/>, printed Oct. 26, 2007, 1 page.

"Babulous :: Keep it loud," at <http://www.babulous.com/home.jhtml>, copyright 2009, Babulous, Inc., printed Mar. 26, 2009, 2 pages.

"Better Propaganda—Free MP3s and music videos," at <http://www.betterpropaganda.com/>, copyright 2004-2005, betterPropaganda, printed Feb. 7, 2007, 4 pages.

"Billboard.biz—Music Business—Billboard Charts—Album Sales—Concert Tours," http://www.billboard.biz/bbbiz/index.jsp, copyright 2007 Nielsen Business Media, Inc., printed Oct. 26, 2007, 3 pages.

"Bluetooth.com—Learn," http://www.bluetooth.com/Bluetooth/Learn/, copyright 2007 Bluetooth SIG, Inc., printed Oct. 26, 2007, 1 page.

Mitchell, Bradley, "Cable Speed—How Fast is Cable Modem Internet?," at <http://www.compnetworking.about.com/od/internetaccessbestuses/f/cablespeed.htm>, copyright 2005, About, Inc., printed Feb. 24, 2010, 2 pages.

"The Classic TV Database—Your Home for Classic TV!—www.classic-tv.com," http://www.classic-tv.com, copyright the Classic TV Database—www.classic-tv.com, printed Feb. 7, 2007, 3 pages.

"Digital Tech Life>> Download of the Week," earliest post Sep. 30, 2005, latest post Jul. 2, 2006, at <http://www.digitaltechlife.com/category/download-of-the-week/>, printed Feb. 16, 2007, 9 pages.

"Digital Music News," at <http://www.digitalmusicnews.com/results?title=musicstrands>, copyright 2003-6 Digital Music News, earliest post Aug. 2005, latest post May 2006, printed Aug. 8, 2006, 5 pages.

"Goombah" Preview, at <http://www.goombah.com/preview.html>, printed Jan. 8, 2008, 5 pages.

(56) References Cited

OTHER PUBLICATIONS

"How many songs are in your iTunes Music library (or libraries in total, if you use more than one)?," at <http://www.macoshints.com/polls/index.php?pid=itunesmusiccount>, includes postings dated as early as Jun. 2008, printed Feb. 24, 2010, copyright 2010, Mac Publishing LLC, 10 pages.
"Zune.net—How-To—Share Audio Files Zune to Zune," http://web.archive.org/web/20070819121705/http://www.zune.net/en-us/support/howto/z . . . , copyright 2007 Microsoft Corporation, printed Nov. 14, 2007, 2 pages.
"Hulu—About," at <http://www.hulu.com/about/product_tour>, copyright 2010, Hulu LLC, appears to have been accessible as early as early 2008, printed Jun. 15, 2010, 2 pages.
Nilsson, Martin, "id3v2.4.0-frames—ID3.org," at <http://www.id3.org/id3v2.4.0-frames>, dated Nov. 1, 2000, last updated Dec. 18, 2006, copyright 1998-2009, printed Jun. 15, 2010, 31 pages.
"Identifying iPod models," at <http://support.apple.com/kb/HT1353>, page last modified Jan. 15, 2010, includes information dating back to 2001,printed Feb. 24, 2010, 13 pages.
"IEEE 802.11—Wikipedia, the free encyclopedia," http://en.wikipedia.org/wiki/IEEE_802.11, printed Oct. 26, 2007, 5 pages.
"iLikeTM—Home," found at <http://www.ilike.com/>, copyright 2007, iLike, printed May 17, 2007, 2 pages.
"Instant Messenger—AIM—Instant Message Your Online Buddies for Free—AIM," http://dashboard.aim.com/aim, copyright 2007 AOL LLC, printed Nov. 8, 2007, 6 pages.
"Last.fm—Wikipedia, the free encyclopedia," at <http://en.wikipedia.org/wiki/Last.fm>, last modified on Aug. 8, 2006, printed Aug. 8, 2006, 7 pages.
"LAUNCHcast Radio—Yahoo! Messenger," http://messenger.yahoo.com/launch.php, copyright 2007 Yahoo! Inc., printed Nov. 8, 2007, 1 page.
Mascia, J. and Reddy, S., "cs219 Project Report—Lifetrak: Music in Tune With Your Life," Department of Electrical Engineering, UCLA '06, Los Angeles, California, copyright 2006, ACM, 11 pages.
"LimeWire—Wikipedia, the free encyclopedia," at <http://en.wikipedia.org/wiki/LimeWire>, last modified Aug. 6, 2006, printed Aug. 8, 2006, 2 pages.
"Liveplasma music, movies, search engine and discovery engine," at <http://www.liveplasma.com>, printed May 17, 2007, 1 page.
"Loomia Personalized Recommendations for Media, Content and Retail Sites," at <http://www.loomia.com/>, copyright 2006-2007, Loomia Inc., printed Feb. 7, 2007, 2 pages.
"Mercora—Music Search and Internet Radio Network," at <http://www.mercora.com/overview.asp>, copyright 2004-2006, Mercora, Inc., printed Aug. 8, 2006, 1 page.
Henry, Alan, "MixxMaker: The Mix Tape Goes Online," Jan. 18, 2008, AppScout, found at <http://appscout.pcmag.com/crazy-start-ups-vc-time/276029-mixxmaker-the-mix-tape-goes-online#fbid=DfUZtDa46ye>, printed Nov. 15, 2011, 4 pages.
"Mongomusic.com—The Best Download mp3 Resource and Information. This website is for sale!," http://www.mongomusic.com/, printed May 17, 2007, 2 pages.
"MP3 music download website, eMusic," at <http://www.emusic.com/>, copyright 2007, eMusic.com Inc., printed Feb. 7, 2007, 1 page.
"Music Downloads—Over 2 Million Songs—Try It Free—Yahoo! Music," http://music.yahoo.com/ymu/default.asp, copyright 2006 Yahoo! Inc., printed Feb. 7, 2007, 1 page.
"Music Recommendations 1.0—MacUpdate," at <http://www.macupdate.com/info.php/id/19575>, Oct. 4, 2005, printed Feb. 16, 2007, 1 page.
Wang, J. and Reinders, M.J.T., Music Recommender system for Wi-Fi Walkman, No. ICT-2003-01 in the ICT Group Technical Report Series, Information & Communication Theory Group, Department of Mediannatics, Faculty of Electrical Engineering, Mathematics and Computer Science, Delft University of Technology, Delft, The Netherlands, 2003, 23 pages.

"MusicGremlin," at <http://www.musicgremlin.com/StaticContent.aspx?id=3>, copyright 2005, 2006, 2007, MusicGremlin, Inc., printed Oct. 26, 2007, 1 page.
"MusicIP—The Music Search Engine," at <http://www.musicip.com/>, copyright 2006-2007, MusicIP Corporation, printed Feb. 7, 2007, 1 page.
"Musicstrands.com—Because Music is Social," brochure, copyright 2006, MusicStrands, Inc., 2 pages.
Linder, Brad, "Muziic media player streams audio from YouTube—for now—Download Squad," at <http://www.downloadsquad.com/2009/03/09/muziic-media-player-streams-audio-from-you . . . >, Mar. 9, 2009, copyright 2003-2009, Weblogs, Inc., printed Jun. 14, 2010, 2 pages.
"MyStrands Download," at <http://www.mystrands.com/overview.vm>, copyright 2003-2007, MediaStrands, Inc., printed Feb. 7, 2007, 3 pages.
"MyStrands for Windows 0.7.3 Beta," copyright 2002-2006, ShareApple.com networks, printed Jul. 16, 2007, 3 pages.
"MyStrands Labs: Patent-pending Technologies," at <http://labs.mystrands.com/patents.html>, earliest description from Nov. 2004,printed Feb. 7, 2007, 5 pages.
"Napster—All the Music You Want," at <http://www.napster.com/using_napster/all_the_music_you_want.html>, copyright 2003-2006, Napster, LLC, printed Feb. 7, 2007, 2 pages.
"Not safe for work—Wikipedia, the free encyclopedia," http://en.wikipedia.org/wiki/Work_safe, printed Nov. 8, 2007, 2 pages.
"Outlook Home Page—Microsoft Office Online," http://office.microsoft.com/en-us/outlook/default.aspx, copyright 2007 Microsoft Corporation, printed Nov. 8, 2007, 1 page.
"FAQ," at <http://blog.pandora.com/faq/>, copyright 2005-2006, Pandora Media, Inc., printed Aug. 8, 2006, 20 pages.
"Pandora Internet Radio—Find New Music, Listen to Free Web Radio," at <http://www.pandora.com/>, copyright 2005-2007, Pandora Media, Inc., printed Feb. 7, 2007, 1 page.
"Pandora Radio—Listen to Free Internet Radio, Find New Music—The Music Genome Project," at <http://www.pandora.com/mgp>, copyright 2005-2007, Pandora Media, Inc., printed Oct. 26, 2007, 1 page.
Sarwar, Badrul M. et al., "Recommender Systems for Large-scale E-Commerce: Scalable Neighborhood Formation Using Clustering," Proceedings of the Fifth ♂ International Conference on Computer and Information Technology, Dec. 27-28, 2002, East West University, Dhaka, Bangladesh, 6 pages.
"Review of Personalization Technologies: Collaborative Filtering vs. ChoiceStream's Attributized Bayesian Choice Modeling," Technology Brief, ChoiceStream, Feb. 4, 2004, found at <http://www.google.com/url?sa=t&rct=j&q=choicestream%20review%20of%20personalization&source=web&cd=1&ved=0CDcQFjAA&url=http%3A%2Fwww.behavioraltargeting.info%2Fdownloadattachment.php%3Fald%3Dcf74d490a8b97edd535b4ccdbfd0df55%26articleId%3D31&ei=C2jeTr71AurZ0QGCgsGvBw&usg=AFQjCNEBLn7jJCDh-VYty3h79uFKGFBkRw>, 13 pages.
"Rhapsody—Full-length music, videos and more—Free," http://www.rhapsody.com/welcome.html, copyright 2001-2007 Listen.com, printed Feb. 7, 2007, 1 page.
"Ringo: Social Information Filtering for Music Recommendation," http://jolomo.net/ringo.html, printed Aug. 3, 2009, 1 page.
"RYM FAQ—Rate Your Music," at <http://rateyourmusic.com/faq/>, copyright 2000-2007, rateyourmusic.com, printed Nov. 8, 2007, 14 pages.
Cai, Rui et al., "Scalable Music Recommendation by Search," Proc. ACM Multimedia, Augsburg, Germany, Sep. 23-28, 2007, pp. 1065-1074.
"Songbird," at <http://getsongbird.com/>, copyright 2010, Songbird, printed Jun. 15, 2010, 2 pages.
"SongReference," at <http://songreference.com/>, copyright 2008, SongReference.com, printed Jun. 15, 2010, 1 page.
"Start Listening with Last.fm," at <http://www.last.fm/>, date unknown but may date back as early as 2002, 1 page.
"Take a look at the Future of Mobile Music—Music Guru," at <http://www.symbian-freak.com/news/006/02/music_guru.htm> Feb. 23, 2006, copyright 2005, Symbian freak, printed Feb. 7, 2007, 3 pages.

(56) References Cited

OTHER PUBLICATIONS

"That canadian girl >> Blog Archive >> GenieLab," posted Feb. 22, 2005, at <http://www.thatcanadiangirl.co.uk/blog/2005/02/22/genielab/>, copyright 2007, Vero Pepperrell, printed Feb. 16, 2007, 3 pages.

Barrie-Anthony, Steven, "That song sounds familiar," Los Angeles Times, Feb. 3, 2006, available from <http://www.calendarlive.com/printedition/calendar/cl-et-pandora3feb03,0,7458778.story?track=tottext,0,19432.story?track=tothtml>, printed Feb. 3, 2006, 5 pages.

Nealon, Andrew D., "The Daily Barometer—GenieLab.com grants music lovers' wishes," posted Feb. 16, 2005, at <http://media.barometer.orst.edu/home/index.cfm?event=displayArticlePrinterFriendly&uSt . . . >, copyright 2007, The Daily Barometer, printed Feb. 16, 2007, 2 pages.

"The Internet Movie Database (IMDb)," http://www.imdb.com/, copyright 1990-2007 Internet Movie Database Inc., printed Feb. 7, 2007, 3 pages.

"Thunderbird—Reclaim your inbox," http://www.mozilla.com/en-US/thunderbird/, copyright 2005-2007 Mozilla, printed Nov. 8, 2007, 2 pages.

"Tour's Profile," at <http://mog.com/Tour>, copyright 2006-2009, Mog Inc., printed Aug. 3, 2009, 11 pages.

"Trillian (software)—Wikipedia, the free encyclopedia," http://en.wikipedia.org/wiki/Trillian_(instant_messenger), printed Nov. 8, 2007, 11 pages.

Golbeck, Jennifer, "Trust and Nuanced Profile Similarity in Online Social Networks," Mindswap Technical Report TR-MS1284, 2006, available from <http://www.cs.umd.edu/~golbeck/publications.shtml>, 30 pages.

"Try Napster free for 7 Days—Play and download music without paying per song.," http://www.napster.com/choose/index.html, copyright 2003-2007 Napster, LLC, printed Feb. 7, 2007, 1 page.

"uPlayMe.com Meet People, Music Sharing—Home," at <http://www.uplayme.com/>, copyright 2008, uPlayMe, Inc., printed Mar. 26, 2009, 1 page.

"UpTo11.net—Music Recommendations and Search," at <http://www.upto11.net/>, copyright 2005-2006, Upto11.net, printed Feb. 7, 2007, 1 page.

"Webjay—Playlist Community," at <http://www.webjay.org/>, copyright 2006, Yahoo! Inc., printed Feb. 7, 2007, 5 pages.

"Welcome to the Musicmatch Guide," at <http://www.mmguide.musicmatch.com/>, copyright 2001-2004, Musicmatch, Inc., printed Feb. 7, 2007, 1 page.

"What is the size of your physical and digital music collection?," at <http://www.musicbanter.com/general-music/47403-what-size-your-physical-digital-music-collection-12.html>, earliest posting shown: Sep. 21, 2008, printed Feb. 24, 2010, copyright 2010, Advameg, Inc., SEO by vBSEO 3.2.0 copyright 2008, Crawlability, Inc., 6 pages.

Dean, Katie, "Whose Song is That, Anyway?," Wired News, Feb. 12, 2003, at <http://www.wired.com/news/digiwood/1,57634-0.html>, copyright 2005, Lycos, Inc., printed Oct. 9, 2006, 3 pages.

Wang, J. et al., "Wi-Fi Walkman: A wireless handhold that shares and recommend music on peer-to-peer networks," in Proceedings of Embedded Processors for Multimedia and Communications II, part of the IS&T/SPIE Symposium on Electronic Imaging 2005, Jan. 16-20, 2005, San Jose, California, Proceedings published Mar. 8, 2005, found at <http://citeseerx.ist.psu.edu/viewdoc/download-?doi=10.1.1.108.3459&rep=rep1&type=pdf>, 10 pages.

"Yahoo Music Jukebox," Wikipedia, at <http://en.wikipedia.org/wiki/Yahoo_music_engine>, last modified Aug. 3, 2006, printed Aug. 8, 2006, 1 page.

"Yahoo! Messenger—Chat, Instant message, SMS, PC Calls and More," http://messenger.yahoo.com/webmessengerpromo.php, copyright 2007 Yahoo! Inc., printed Oct. 26, 2007, 1 page.

"Yahoo! Music," at <http://info.yahoo.com/privacy/ca/yahoo/music/>, Aug. 14, 2007, copyright 2007, Yahoo! Canada Co., obtained from the Internet Archive, printed Apr. 19, 2011, 4 pages.

"YouTube—Broadcast Yourself.," at <http://www.youtube.com/>, copyright 2007, YouTube, LLC, printed Oct. 26, 2007, 2 pages.

\* cited by examiner

| user | song | artist | genre | decade | time | availability | score |
|---|---|---|---|---|---|---|---|
| hugh | sweet emotion | aerosmith | rock | 1970s | 45:32:21 | local | 95 |
| waymen | so what | miles davis | jazz | 1960s | 6:37 | find | 94 |
| gary | dance in my sleep | dave adams | alternative | 1980s | 4:25 | subscription network | 92 |
| waymen | come away with me | norah jones | jazz | 2000s | 4:56 | subscription network | 88 |
| mike | walk the line | johnny cash | country | 1970s | 5:31 | buy/download | 86 |
| hugh | say hey | the tubes | alternative | 1980s | 20:54:24 | local | 86 |
| hugh | you get what you give | new radicals | alternative | 1990s | 4:12:03 | local | 83 |
| hugh | tenderness | general public | new wave | 1980s | 25:32:21 | local | 83 |
| hugh | running with the devil | van halen | rock | 1970s | 12:35:11 | local | 82 |
| gene | rebel yell | billy idol | punk | 1980s | 0:32 | subscription network | 81 |
| gene | beautiful day | u2 | rock | 2000s | 7:54 | local | 79 |
| mike | still lovin you | scorpions | metal | 1980s | 1:03 | subscription network | 76 |
| gene | true | spandau ballet | dance | 1980s | 3:31 | subscription network | 72 |
| gary | heart of the night | poco | rock | 1970s | 0:42 | subscription network | 67 |
| gary | roundabout | yes | rock | 1970s | 6:11 | buy/download | 67 |
| gene | alison | elvis costello | alternative | 1980s | 5:51 | buy/download | 65 |
| gary | run to the hills | iron maiden | metal | 1970s | 7:21 | local | 64 |
| mike | hound dog | elvis presley | rock | 1980s | 6:19 | buy/download | 55 |
| waymen | something more | sugarland | country | 2000s | 0:37 | subscription network | 25 |

CURRENT SONG
CURRENT ALBUM

USER: HUGH

CURRENT SONG
CURRENT ALBUM

USER: HUGH

| user | song | artist | genre | decade | time | availability | score |
|---|---|---|---|---|---|---|---|
| gary | dance in my sleep | dave adams | alternative | 1980s | 4:25 | subscription network | 92 |
| hugh | say hey | the tubes | alternative | 1980s | 20:54:24 | local | 86 |
| hugh | you get what you give | new radicals | alternative | 1990s | 4:12:03 | local | 83 |
| gene | alison | elvis costello | alternative | 1980s | 5:51 | buy/download | 65 |
| hugh | sweet emotion | aerosmith | rock | 1970s | 45:32:21 | local | 95 |
| hugh | running with the devil | van halen | rock | 1970s | 12:35:11 | local | 82 |
| gene | beautiful day | u2 | rock | 2000s | 7:54 | local | 79 |
| gary | heart of the night | poco | rock | 1970s | 0:42 | subscription network | 67 |
| gary | roundabout | yes | rock | 1970s | 6:11 | buy/download | 67 |
| mike | hound dog | elvis presley | rock | 1980s | 6:19 | buy/download | 55 |
| mike | still lovin you | scorpions | metal | 1980s | 1:03 | subscription network | 76 |
| gary | run to the hills | iron maiden | metal | 1970s | 7:21 | local | 64 |
| waymen | so what | miles davis | jazz | 1960s | 6:37 | find | 94 |
| waymen | come away with me | norah jones | jazz | 2000s | 4:56 | subscription network | 88 |
| gene | rebel yell | billy idol | punk | 1980s | 0:32 | subscription network | 81 |
| hugh | tenderness | general public | new wave | 1980s | 5:31 | local | 83 |
| gene | true | spandau ballet | dance | 1980s | 25:32:21 | subscription network | 72 |
| mike | walk the line | johnny cash | country | 1970s | 3:31 | buy/download | 86 |
| waymen | something more | sugarland | country | 2000s | 0:37 | subscription network | 25 |

*FIG. 16*

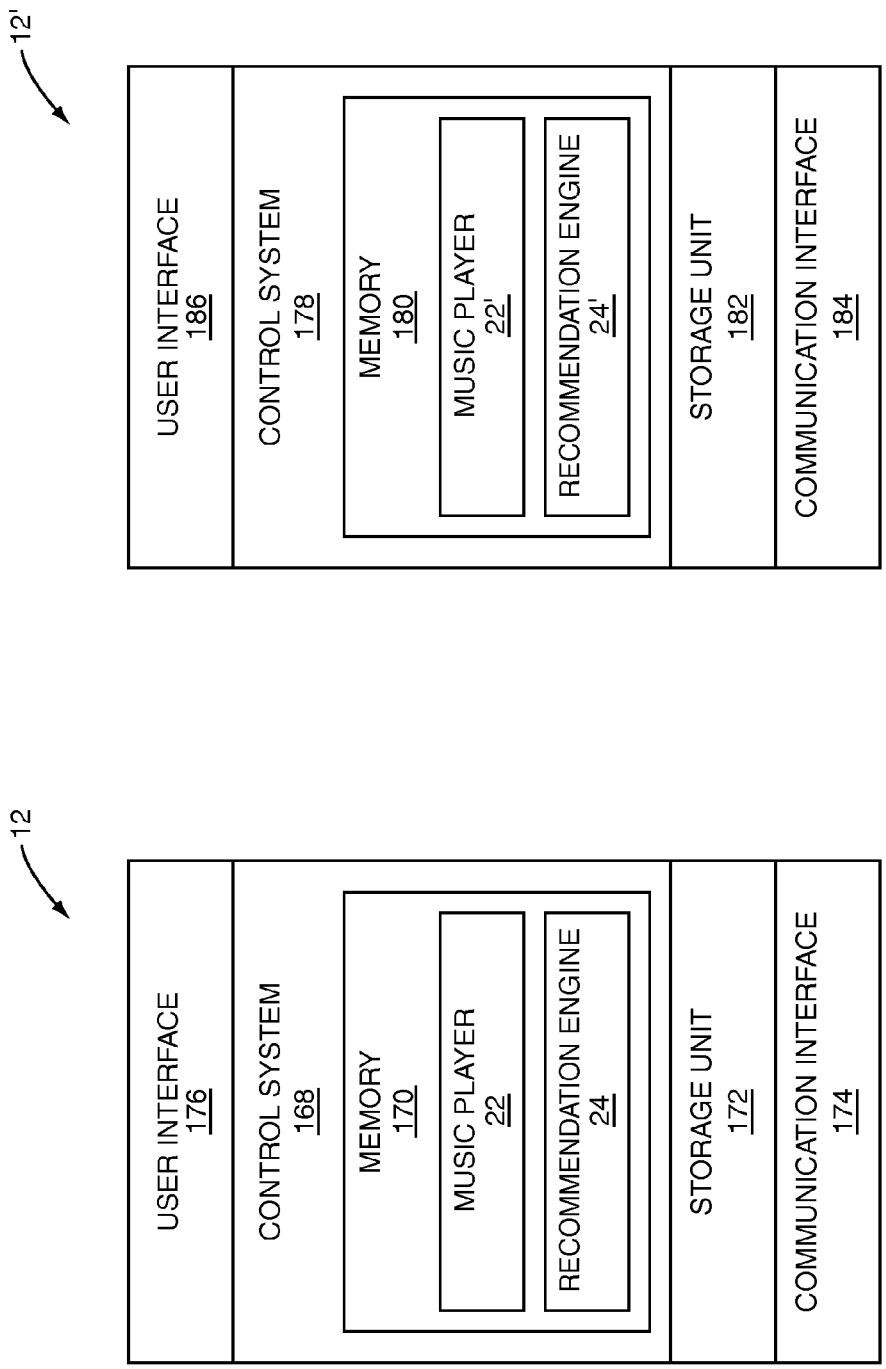

SYSTEM AND METHOD FOR IDENTIFYING MUSIC CONTENT IN A P2P REAL TIME RECOMMENDATION NETWORK

RELATED APPLICATIONS

This application is a Continuation of U.S. patent application Ser. No. 12/911,778, entitled SYSTEM AND METHOD FOR IDENTIFYING MUSIC CONTENT IN A P2P REAL TIME RECOMMENDATION NETWORK, filed on Oct. 26, 2010, which is a Continuation of U.S. patent application Ser. No. 11/609,948, entitled SYSTEM AND METHOD FOR IDENTIFYING MUSIC CONTENT IN A P2P REAL TIME RECOMMENDATION NETWORK, filed on Dec. 13, 2006, which is a Continuation-in-Part of U.S. patent application Ser. No. 11/484,130, entitled P2P NETWORK FOR PROVIDING REAL TIME MEDIA RECOMMENDATIONS, filed on Jul. 11, 2006, now U.S. Pat. No. 7,680,959, each of which are hereby incorporated herein by reference in their entireties.

FIELD OF THE INVENTION

The present invention relates to media recommendations, such as music or video recommendations, and more specifically relates to a peer-to-peer (P2P) network for providing real time media recommendations.

BACKGROUND OF THE INVENTION

In recent years, there has been an enormous increase in the amount of digital media, such as music, available online. Services such as Apple's iTunes enable users to legally purchase and download music. Other services such as Yahoo! Music Unlimited and RealNetwork's Rhapsody provide access to millions of songs for a monthly subscription fee. As a result, music has become much more accessible to listeners worldwide. However, the increased accessibility of music has only heightened a long-standing problem for the music industry, which is namely the issue of linking audiophiles with new music that matches their listening preferences.

Many companies, technologies, and approaches have emerged to address this issue of music recommendation. Some companies have taken an analytical approach. They review various attributes of a song, such as melody, harmony, lyrics, orchestration, vocal character, and the like, and assign a rating to each attribute. The ratings for each attribute are then assembled to create a holistic classification for the song that is then used by a recommendation engine. The recommendation engine typically requires that the user first identify a song that he or she likes. The recommendation engine then suggests other songs with similar attributions. Companies using this type of approach include Pandora (http://www.pandora.com), SoundFlavor (http://www.soundflavor.com), MusicIP (http://www.musicip.com), and MongoMusic (purchased by Microsoft in 2000).

Other companies take a communal approach. They make recommendations based on the collective wisdom of a group of users with similar musical tastes. These solutions first profile the listening habits of a particular user and then search similar profiles of other users to determine recommendations. Profiles are generally created in a variety of ways such as looking at a user's complete collection, the playcounts of their songs, their favorite playlists, and the like. Companies using this technology include Last.fm (http://www.last.fm), Music Strands (http://www.musicstrands.com), WebJay (http://www.webjay.org), Mercora (http://www.mercora.com), betterPropaganda (http://www.betterpropaganda.com), Loomia (http://www.loomia.com), eMusic (http://www.emusic.com), musicmatch (http://www.mmguide.musicmatch.com), genielab (http://genielab.com/), upto11 (http://www.upto11.net/), Napster (http://www.napster.com), and iTunes (http://www.itunes.com) with its celebrity playlists.

The problem with these traditional recommendation systems is that they fail to consider peer influences. For example, the music to which a particular teenager listens may be highly influenced by the music listened to by a group of the teenager's peers, such as his or her friends. As such, there is a need for a music recommendation system and method that recommends music to a user based on the listening habits of a peer group.

SUMMARY OF THE INVENTION

The present invention provides a peer-to-peer (P2P) network for providing real time media recommendations. The media recommendations may be song recommendations or video recommendations. Each time a media presentation is played by a peer device, the peer device provides a recommendation identifying the media presentation to other peer devices in the P2P network. The recommendation generally includes a Globally Unique Identifier (GUID) of the media presentation. The recommendation may also include a Uniform Resource Locator (URL) or other network reference of the media presentation or a preview of the media presentation at a remote content source such as a subscription based service. A peer device having received recommendations from the other peer devices in the P2P network then programmatically, or automatically, selects a next media presentation to play from the media presentations recently played by the other peer devices and one or more locally stored media presentations.

If the selected media presentation is not stored locally by the peer device, the peer device may obtain the selected media presentation from a subscription based service enabling streaming or download of the selected media presentation, an e-commerce service enabling purchase and download of the selected media presentation, or another peer device. In one embodiment, the peer devices are portable devices forming the P2P network via local wireless communication. In another embodiment, the peer devices may be any type of device and form the P2P network via a Wide Area Network (WAN) such as the Internet.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 15 illustrates an exemplary GUI displaying a playlist including songs from both a local music collection of a peer device and recommended songs from other peer devices, where the songs are sorted by a score determined based on user preferences according to one embodiment of the present invention;

FIG. 16 illustrates an exemplary GUI displaying a playlist including songs from both a local music collection of a peer device and recommended songs from other peer devices, where the songs are sorted by both genre and score according to one embodiment of the present invention;

FIG. 19 is a block diagram of a peer device of FIG. 1 according to one embodiment of the present invention;

FIG. 20 is a block diagram of a peer device of FIG. 6 according to one embodiment of the present invention;

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
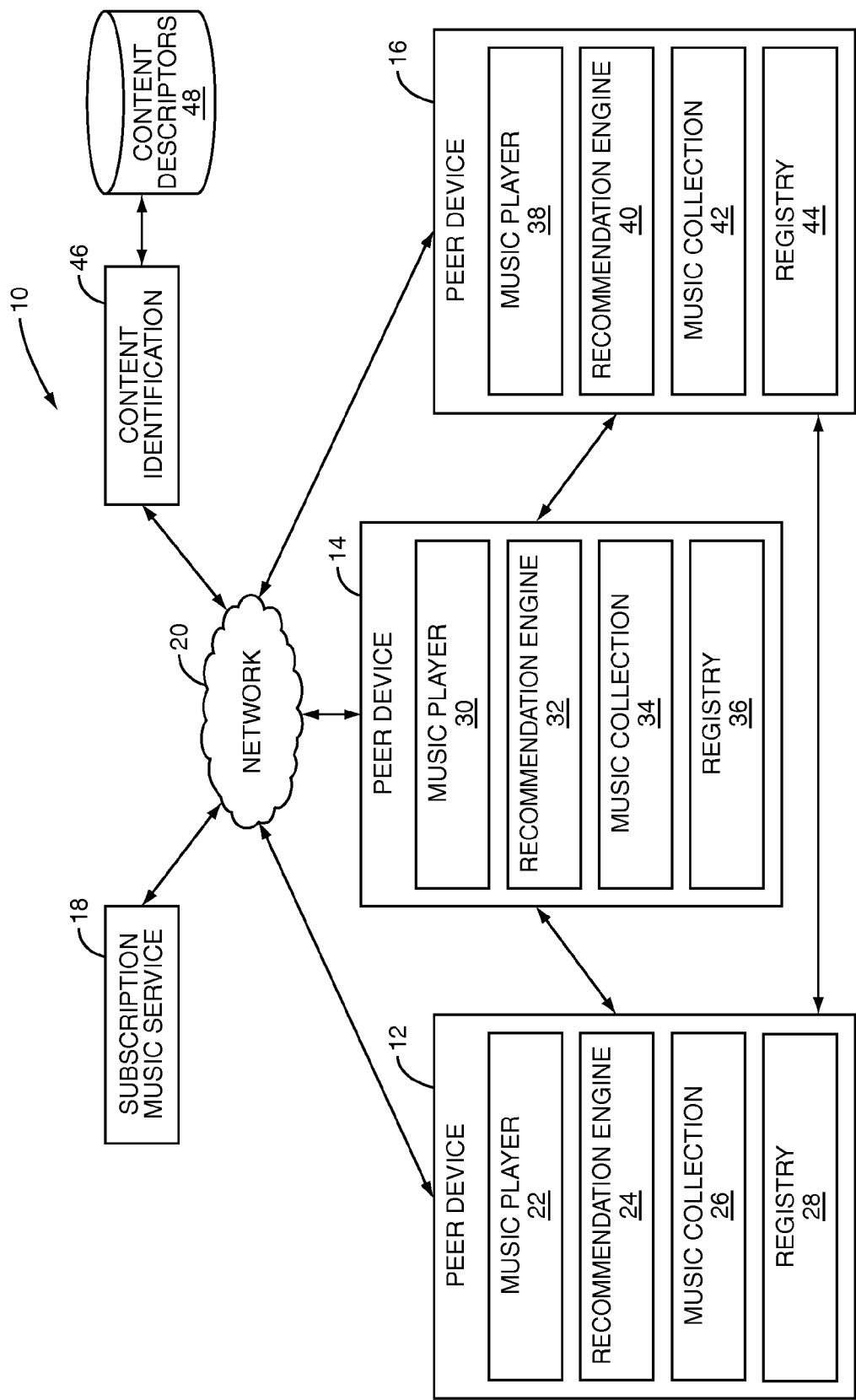
FIG. 1 illustrates a system incorporating a peer-to-peer (P2P) network for real time media recommendations according to one embodiment of the present invention.

FIG. 1 illustrates a system 10 incorporating a peer-to-peer (P2P) network for providing real time song recommendations according to one embodiment of the present invention. Note that while the discussion herein focuses on song recommendations for clarity and ease of discussion, the present invention is equally applicable to providing recommendations for other types of media presentations such as video presentations, as will be apparent to one of ordinary skill in the art upon reading this disclosure. Exemplary video presentations are movies, television programs, and the like. In general, the system 10 includes a number of peer devices 12-16 which are optionally connected to a subscription music service 18 via a network 20, which may be a distributed public network such as, but not limited to, the Internet. Note that while three peer devices 12-16 are illustrated, the present invention may be used with any number of two or more peer devices.

In this embodiment, the peer devices 12-16 are preferably portable devices such as, but not limited to, portable audio players, mobile telephones, Personal Digital Assistants (PDAs), or the like having audio playback capabilities. However, the peer devices 12-16 may alternatively be stationary devices such as personal computers or the like. The peer devices 12-16 include local wireless communication interfaces (FIG. 19) communicatively coupling the peer devices 12-16 to form a P2P network. The wireless communication interfaces may provide wireless communication according to, for example, one of the suite of IEEE 802.11 standards, the Bluetooth standard, or the like.

The peer device 12 includes a music player 22, a recommendation engine 24, a music collection 26, and a registry 28. The music player 22 may be implemented in software, hardware, or a combination of hardware and software. In general, the music player 22 operates to play songs from the music collection 26. The recommendation engine 24 may be implemented in software, hardware, or a combination of hardware and software. The recommendation engine 24 may alternatively be incorporated into the music player 22. The music collection 26 includes any number of songs stored in one or more digital storage units such as, for example, one or more hard-disc drives, one or more memory cards, internal Random-Access Memory (RAM), one or more associated external digital storage devices, or the like. The registry 28 operates to store a registry entry for each song in the music collection 26. In general, each registry entry includes a Globally Unique Identifier (GUID) for the corresponding song in the music collection 26 and a reference to the song in the local storage of the peer device 12. In addition, the registry entry may include a Uniform Resource Locator (URL) or other network reference to the song at a remote content source such as the subscription music service 18 or similar e-commerce service, a URL or other network reference to a preview of the song at a remote content source such as the subscription music service 18 or similar e-commerce service, a score of the song computed by the recommendation engine 24 as discussed below, and a status of the song, where the status may be an indicator of download progress if the song is currently being downloaded. In addition, the registry 28 may store a registry entry for each song recommended by recommendations from the other peer devices 14 and 16 or only for ones of the recommended songs that the peer device 12 has selected for download from the subscription music service 18.

In operation, each time a song is played by the music player 22, the recommendation engine 24 operates to provide a recommendation identifying the song to the other peer devices 14, 16 via the P2P network. The recommendation does not include the song. In one embodiment, the recommendation may be a recommendation file including the GUID for the song and optionally one or more URLs or other network references enabling the other peer devices 14, 16 to obtain the song or a preview of the song from a remote content source such as the subscription music service 18 or a similar e-commerce service. The recommendation file may additionally or alternatively include a URL enabling the other peer devices 14, 16 to obtain the song from the peer device 12. In addition, as discussed below in detail, the recommendation engine 24 operates to programmatically, or automatically, select a next song to be played by the music player 22 based on recommendations received from the other peer devices 14, 16 identifying songs recently played by the other peer devices 14, 16 and user preferences associated with the user of the peer device 12. If the select song is not stored locally at the peer device 12, the peer device 12 may obtain the select song or a preview thereof from, for example, the subscription music service 18, a similar e-commerce service, or another peer device 14, 16.

Like the peer device 12, the peer device 14 includes a music player 30, a recommendation engine 32, a music collection 34, and a registry 36; and the peer device 16 includes a music player 38, a recommendation engine 40, a music collection 42, and a registry 44.

The subscription music service 18 may be a service hosted by a server connected to the network 20. Exemplary subscription based music services that may be modified to operate according to the present invention are Yahoo! Music Unlimited digital music service and RealNetwork's Rhapsody digital music service.

The system 10 may also include a content identification function 46 and an associated content descriptors database 48. The content identification function 46 and the content descriptors database 48 are hosted by a server connected to the network 20 and may be hosted by the same server hosting the subscription music service 18. The content identification function 46 may be implemented in software, hardware, or a combination thereof. The content descriptors database 48 operates to store a content descriptor for each of a number of songs known to the system 10. In one embodiment, the content descriptors database 48 stores a content descriptor for each song hosted by the subscription music service 18. Each content descriptor may include one or more digital fingerprints for the associated song, the GUID for the song, metadata for the song, and one or more URLs for the song and/or a preview of the song at one or more remote content sources such as the subscription music service 18 or similar e-commerce service. The metadata for the song may include, for example, the title of the song, artist, album, date of release, lyrics, an album cover image, and the like.

In operation, using the peer device 12 as an example, the content identification function 46 may be used by the peer device 12 to obtain GUIDs for the songs in the music collection 26. More specifically, the peer device 12 may provide identification parameters for the songs in the music collection 26 to the content identification function 46. Based on a comparison of identification parameters for the songs and the content descriptors in the content descriptors database 48, the content identification function 46 identifies the songs and provides the corresponding GUIDs and optionally the corresponding metadata and URL(s) to the peer device 12. The peer device 12 then uses this information to generate corresponding registry entries for the songs in the registry 28.

In addition to or as an alternative to the content identification function 46, various schemes may be used to obtain or otherwise provide the GUIDs for the songs in the music collections 26, 34, and 42. For example, if the songs are downloaded from a remote content source such as the subscription music service 18, the GUIDs may be provided along with the songs or be included as metadata within the song files. As another example, if the songs are imported from a Compact Disc (CD), the GUIDs for the songs may be obtained from a remote database as part of the importing process. More specifically, when importing the songs from the CD, information such as, for example, the number of tracks on the CD and the length of each track may be provided to a remote service such as Gracenote (http://www.gracenote.com). In response, the remote service may provide the GUIDs and optionally metadata to the corresponding peer device 12, 14, or 16 for each of the songs imported from the CD.

Figure 2:
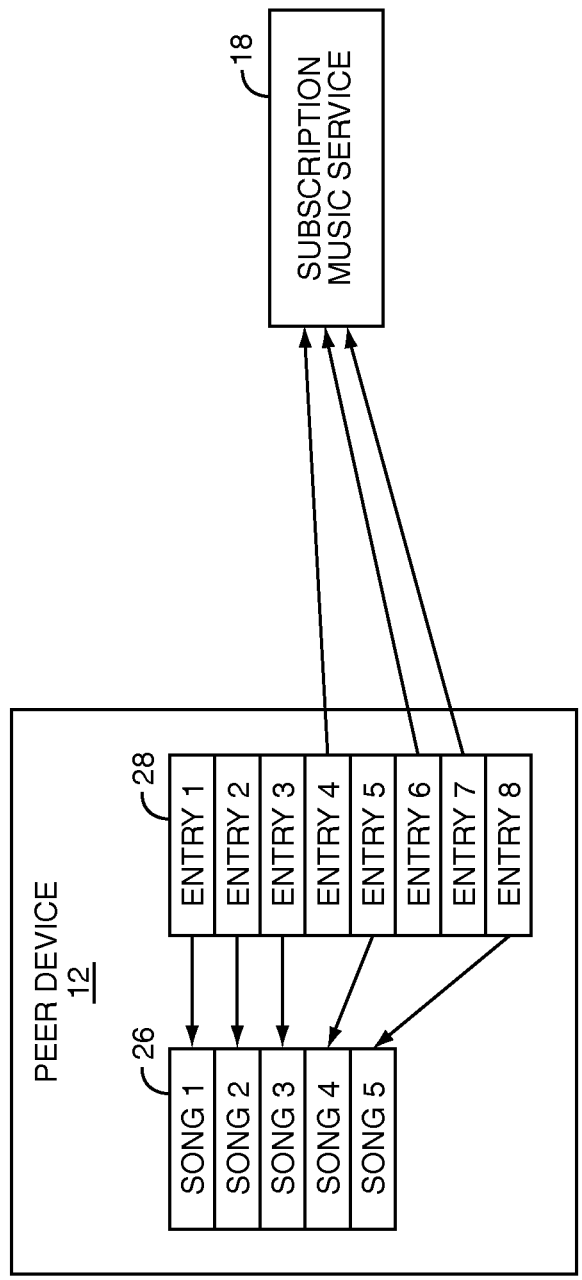
FIG. 2 illustrates the registry of one of the peer devices in more detail according to one embodiment of the present invention.

FIG. 2 illustrates the registry 28 of the peer device 12 in more detail according to one embodiment of the present invention. Note that this discussion is equally applicable to the registries 36 and 44 of the other peer devices 14 and 16. As illustrated, the registry 28 includes a number of registry entries. In this example, the registry 28 includes eight registry entries. However, the present invention is not limited thereto. Each of the registry entries includes a reference to a corresponding song. If the song is stored locally in the music collection 26, the reference is to the song in the local storage of the peer device 12. If the song is not stored locally in the music collection, the reference may be a URL or other network reference to the song and/or a URL or other network reference to a preview of the song at the subscription music service 18 or similar content provider. In this example, ENTRY1-ENTRY3, ENTRY 5, and ENTRY 8 are registry entries for the songs in the music collection 26 stored locally at the peer device 12. ENTRY 4, ENTRY 5, and ENTRY 7 are entries for songs identified by recommendations from the other peer devices 14 and 16 that reference the songs or previews of the songs at the subscription music service 18.

It should be noted that in another embodiment, the registry entries for songs not stored locally at the peer device 12 as part of the music collection 26 may additionally or alternatively include a reference such as a URL to the corresponding song at one or more of the other peer devices 14-16 such that the peer device 12 may download or stream the song from one of the other peer devices 14-16 if desired.

Figure 3:
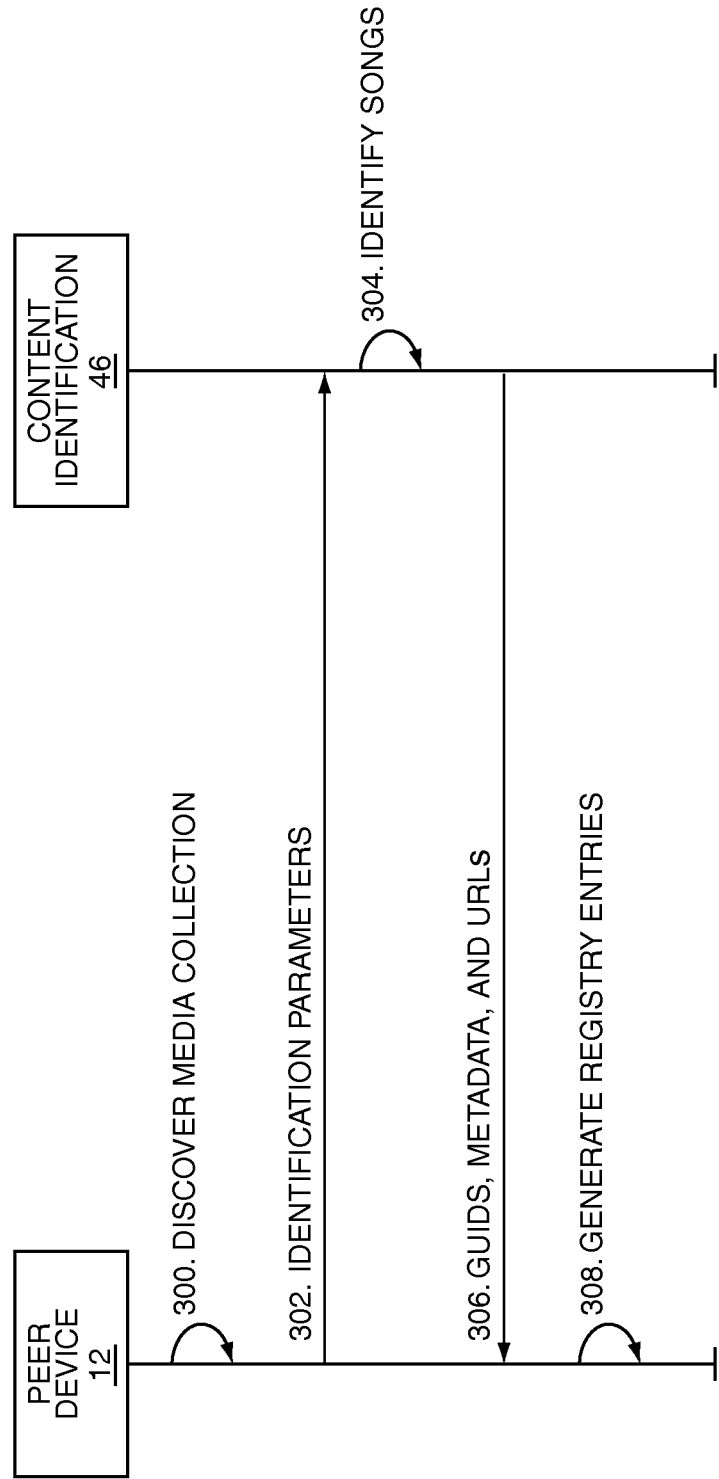
FIG. 3 illustrates the operation of the content identification function of FIG. 1 according to one embodiment of the present invention.

FIG. 3 illustrates the operation of the content identification function 46 according to one embodiment of the present invention. While this example focuses on the identification of multiple songs, the process is equally applicable to a single song. First, the peer device 12 discovers the music collection 26 (step 300). For example, the peer device 12 may scan the local storage of the peer device 12 or a select portion thereof for songs. As another example, the peer device 12 may detect new songs downloaded from a remote content source, imported from a CD, or the like.

The peer device 12 then provides one or more identification parameters for each of the songs to the content identification function 46 (step 302). In a first embodiment, the identification parameters include one or more digital fingerprints for each of the songs. In order to generate the fingerprints, the peer device 12 may analyze one or more segments of a song to determine, for example, beats-per-minute and/or compute a Fast Fourier Transform (FFT). The segments of the song analyzed to generate the fingerprints may be selected at random or in some predetermined fashion. For a more detailed discussion of generating fingerprints for a song and identifying the song based on the fingerprints, see U.S. Pat. No. 6,990,453, entitled SYSTEM AND METHODS FOR RECOGNIZING SOUND AND MUSIC SIGNALS IN HIGH NOISE AND DISTORTION, issued Jan. 24, 2006, which is hereby incorporated by reference in its entirety.

In a second embodiment, the identification parameters include one or more samples of each of the songs, rather than fingerprints. The content identification function 46 may then generate fingerprints for the songs using the samples of the songs. In a third embodiment, the identification parameters include metadata describing each of the songs and optionally fingerprints for a select number of the songs. The fingerprints of the select number of songs may be used for verification purposes in order to determine whether the peer device 12 is spoofing the content identification function 46 with metadata for songs that are not in fact stored in the music collection 26 of the peer device 12. In a fourth embodiment, the identification parameters include metadata describing each of the songs and one or more samples of a select number of the songs. The samples of the select number of songs may be used to generate fingerprints for the songs, which may then be used for verification purposes as described above.

The content identification function 46 then identifies the songs using the song identification parameters and the content descriptors in the content descriptors database 48 (step 304). The manner in which the songs are identified varies depending on the identification parameters. If the identification parameters are fingerprints for the songs, the content identification function 46 may identify the songs by comparing the fingerprints to the fingerprints of the content descriptors in the content descriptors database 48. A song is identified when the fingerprints for the song match the fingerprints of a particular content descriptor. If the identification parameters are samples of the songs, the content identification function 46 may generate fingerprints for the songs from the samples and then identify the songs by comparing the fingerprints to the fingerprints of the content descriptors. If the identification parameters include metadata describing the songs, the content identification function 46 may identify the songs by comparing the metadata to the metadata of the content descriptors. When the metadata of a song matches the metadata of a particular content descriptor, the song is identified as the song corresponding to the matching content descriptor.

Once the songs are identified, the GUIDs for the songs from the corresponding content descriptors are provided to the peer device 12 (step 306). Optionally, the metadata for the songs and the URLs for obtaining the songs and/or previews of the songs from a remote content source such as the subscription music service 18 or similar e-commerce service may also be provided to the peer device 12. The peer device 12 then generates registry entries for the songs in the registry 28 (step 308). The registry entries include the GUIDs for the songs. In addition, the registry entries may include the metadata and/or URL(s) for the songs. The metadata may additionally or alternatively be used to add, update, or correct metadata for the songs stored in the corresponding song files.

Figure 4:
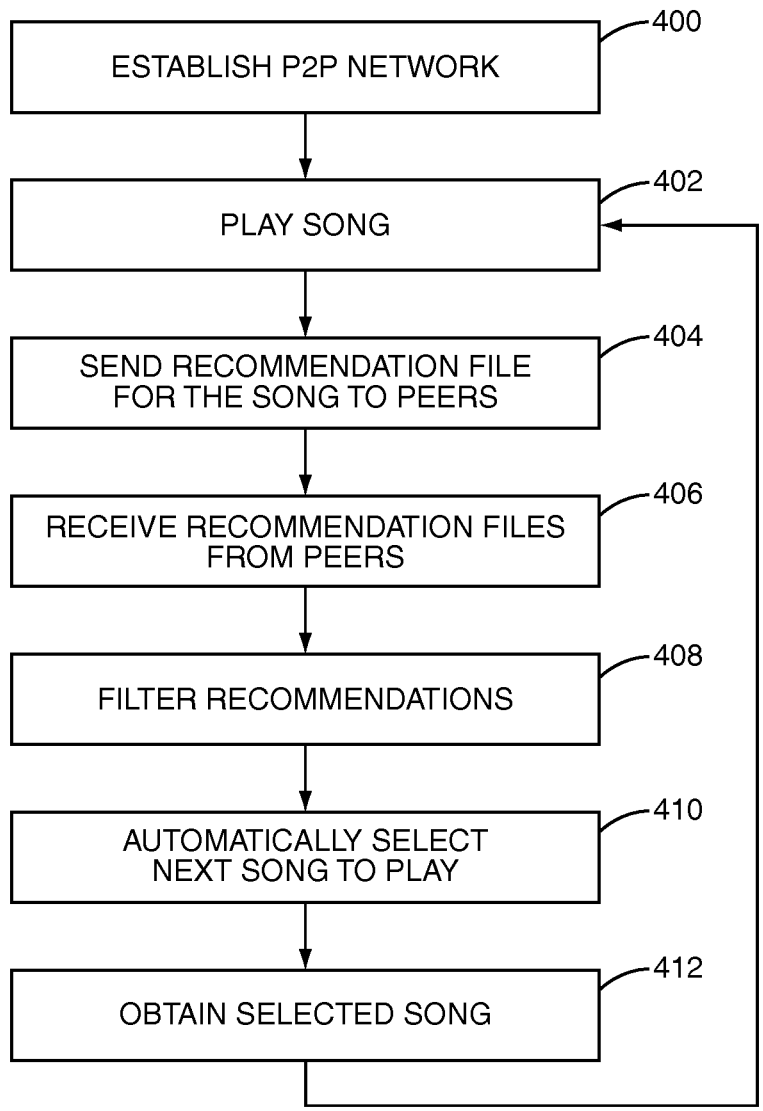
FIG. 4 illustrates the operation of the peer device of FIG. 1 according to one embodiment of the present invention.

FIG. 4 illustrates the operation of the peer device 12 with respect to providing recommendations to the other peer devices 14-16 and receiving and processing recommendations from the other peer devices 14-16 according to one embodiment of the present invention. The following discussion is equally applicable to the other peer devices 14, 16. First, the peer devices 12-16 cooperate to establish a P2P network (step 400). The P2P network may be initiated using, for example, an electronic or verbal invitation. Invitations may be desirable when the user wishes to establish the P2P network with a particular group of other users, such as his or her friends. Note that this may be beneficial when the user desires that the music to which he or she listens be influenced only by the songs listened to by, for example, the user's friends. Invitations may also be desirable when the number of peer devices within a local wireless coverage area of the peer device 12 is large. As another example, the peer device 12 may maintain a "buddy list" identifying friends of the user of the peer device 12, where the peer device 12 may automatically establish a P2P network with the peer devices of the users identified by the "buddy list" when the peer devices are within a local wireless coverage area of the peer device 12.

Alternatively, the peer device 12 may establish an ad-hoc P2P network with the other peer devices 14, 16 by detecting the other peer devices 14, 16 within the local wireless coverage area of the peer device 12 and automatically establishing the P2P network with at least a subset of the detected peer devices 14, 16. In order to control the number of peer devices within the ad-hoc P2P network, the peer device 12 may compare user profiles of the users of the other peer devices 14, 16 with a user profile of the user of the peer device 12 and determine whether to permit the other peer devices 14, 16 to enter the P2P network based on the similarities of the user profiles. The user profiles may include information identifying the users, demographic information, and optionally statistical information regarding music collections of the users, the play histories of the users, and the like.

At some point after the P2P network is established, the peer device 12 plays a song (step 402). Initially, before any recommendations have been received from the other peer devices 14, 16, the song may be a song from the music collection 26 selected by the user of the peer device 12. Prior to, during, or after playback of the song, the recommendation engine 24 sends a recommendation file identifying the song to the other peer devices 14, 16 (step 404). The recommendation file is also referred to herein as a recommendation. The recommendation file may include, but is not limited to, information identifying the song such as the GUID for the song, title of the song, or the like; the URL for the song at a remote content source such as the subscription music service 18 or an e-commerce service enabling purchase and download of the song; a URL enabling download or streaming of a preview of the song from the subscription music service 18 or a similar e-commerce service; metadata describing the song such as ID3 tags including, for example, genre, the title of the song, the artist of the song, the album on which the song can be found, the date of release of the song or album, the lyrics, and the like. In one embodiment, the recommendation file includes the GUID for the song and optionally a URL for the song at a remote content source such as the subscription music service 18 or similar e-commerce service, a URL for a preview of the song at a remote content source such as the subscription music service 18 or similar e-commerce service, and/or a URL for the song at the peer device 12.

The recommendation file may also include a list of recommenders including information identifying each user having previously recommended the song and a timestamp for each recommendation. For example, if the song was originally played at the peer device 14 and then played at the peer device 16 in response to a recommendation from the peer device 14, the list of recommenders may include information identifying the user of the peer device 14 or the peer device 14 and a timestamp identifying a time at which the song was played or recommended by the peer device 14, and information identifying the user of the peer device 16 or the peer device 16 and a timestamp identifying a time at which the song was played or recommended by the peer device 16. Likewise, if the peer device 12 then selects the song for playback, information identifying the user of the peer device 12 or the peer device 12 and a corresponding timestamp may be appended to the list of recommenders.

The peer device 12, and more specifically the recommendation engine 24, also receives recommendations, or more specifically recommendation files, from the other peer devices 14, 16 (step 406). The recommendation files from the other peer devices 14, 16 identify songs played by the other peer devices 14, 16. In one embodiment, each of the recommendation files includes the GUID for the song and optionally a URL for the song at a remote content source such as the subscription music service 18 or similar e-commerce service, a URL for a preview of the song at a remote content source such as the subscription music service 18 or similar e-commerce service, and/or a URL for the song at the peer device 14, 16.

Optionally, the recommendation engine 24 may filter the recommendations from the other peer devices 14, 16 (step 408). More specifically, the recommendation engine 24 may filter the recommendations based on, for example, user, genre, artist, title, album, lyrics, date of release, or the like. In addition or alternatively, the recommendation engine 24 may filter the recommendations to remove or block recommendations for songs that are not included in the music collection 26 or accessible to the peer device 12 from a remote content source such as, for example, the subscription music service 18 or similar e-commerce service. Songs may not be accessible to the peer device 12 from the remote content source if, for example, the user of the peer device 12 is not registered with the remote content source. Using the subscription music service 18 as an example, songs hosted by the subscription music service 18 may not be accessible to the peer device 12 unless the user of the peer device 12 is a subscriber of the subscription music service 18. Note that if the user thereafter registers with the remote content source, the recommendation engine 24 may provide previously blocked recommendations if desired by the user. In another embodiment, the recommendation engine 24 may filter the recommendations to remove or block recommendations for songs that are not stored in the music collection 26.

Based on user preferences, the recommendation engine 24 then automatically selects a next song to play from the songs identified by the recommendations received from the other peer devices 14, 16, optionally songs identified by previously received recommendations, and one or more songs from the music collection 26 (step 410). In the preferred embodiment discussed below, the songs identified by the recommendations from the other peer devices 14, 16 and the songs from the music collection 26 are scored or ranked based on the user preferences. Then, based on the scores, the recommendation engine 24 selects the next song to play.

In one embodiment, the recommendation engine 24 considers only those songs identified by recommendations received since a previous song selection. For example, if the song played in step 402 was a song selected by the recommendation engine 24 based on prior recommendations from the peer devices 14, 16, the recommendation engine 24 may only consider the songs identified in new recommendations received after the song was selected for playback in step 402 and may not consider the songs identified in the prior recommendations. This may be beneficial if the complexity of the recommendation engine 24 is desired to be minimal such as when the peer device 12 is a mobile terminal or the like having limited processing and memory capabilities. In another embodiment, the recommendation engine 24 may consider all previously received recommendations, where the recommendations may expire after a predetermined or user defined period of time.

As discussed below, the user preferences used to select the next song to play may include a weight or priority assigned to each of a number of categories such as user, genre, decade of release, and availability. Generally, availability identifies whether songs are stored locally in the music collection 26; available via the subscription music service 18; available for download, and optionally purchase, from an e-commerce service or one of the other peer devices 14, 16; or are not currently available. If not available, the user may choose to search for the songs if desired. The user preferences may be stored locally at the peer device 12 or obtained from a central server via the network 20. If the peer device 12 is a portable device, the user preferences may be configured on an associated user system, such as a personal computer, and transferred to the peer device 12 during a synchronization process. The user preferences may alternatively be automatically provided or suggested by the recommendation engine 24 based on a play history of the peer device 12, the songs in the music collection 26, the user profile for the peer device 12, or any combination thereof.

Once the next song to play is selected, the peer device 12 obtains the selected song (step 412). If the selected song is part of the music collection 26, the peer device 12 obtains the selected song from the music collection 26. If the selected song is not part of the music collection 26, the recommendation engine 24 obtains the selected song from the subscription music service 18, an e-commerce service, or one of the other peer devices 14, 16. For example, as discussed above, the recommendation for the song may include a URL providing a link to the song at a remote content source, and the peer device 12 may download or alternatively stream the selected song from the remote content source using the URL. As another alternative, the recommendation for the song may additionally or alternatively include a URL providing a link to the song at one of the peer devices 14, 16 from which the corresponding recommendation came such that the peer device 12 may download or stream the selected song from the one of the peer devices 14, 16. Once obtained, the selected song is played and the process repeats (steps 402-412).

It should be noted that the recommendation engine 24 may provide a download queue and operate to download the songs or previews of the songs in the download queue using, for example, a background process. More specifically, as discussed below, both recommended songs and locally stored songs may be scored by the recommendation engine 24. For recommended songs, the peer device 12 determines whether the songs are already included in the music collection 26 by comparing, for example, the GUIDs of the recommended songs to the registry entries in the registry 28. Recall that the registry includes a registry entry for each song in the music collection 26, where each registry entry includes the GUID for the corresponding song. Songs that are not stored locally and have a score above a first threshold may be added to the download queue such that the songs are downloaded from, for example, the subscription music service 18. The GUIDs for the songs are obtained if needed, and registry entries for the songs are generated and stored in the registry 28 either before or after download from the subscription music service 18. Songs that are not stored locally and have a score less than the first threshold but greater than a second threshold may be added to the download queue such that previews of the songs are downloaded from, for example, the subscription music service 18.

Figure 5:
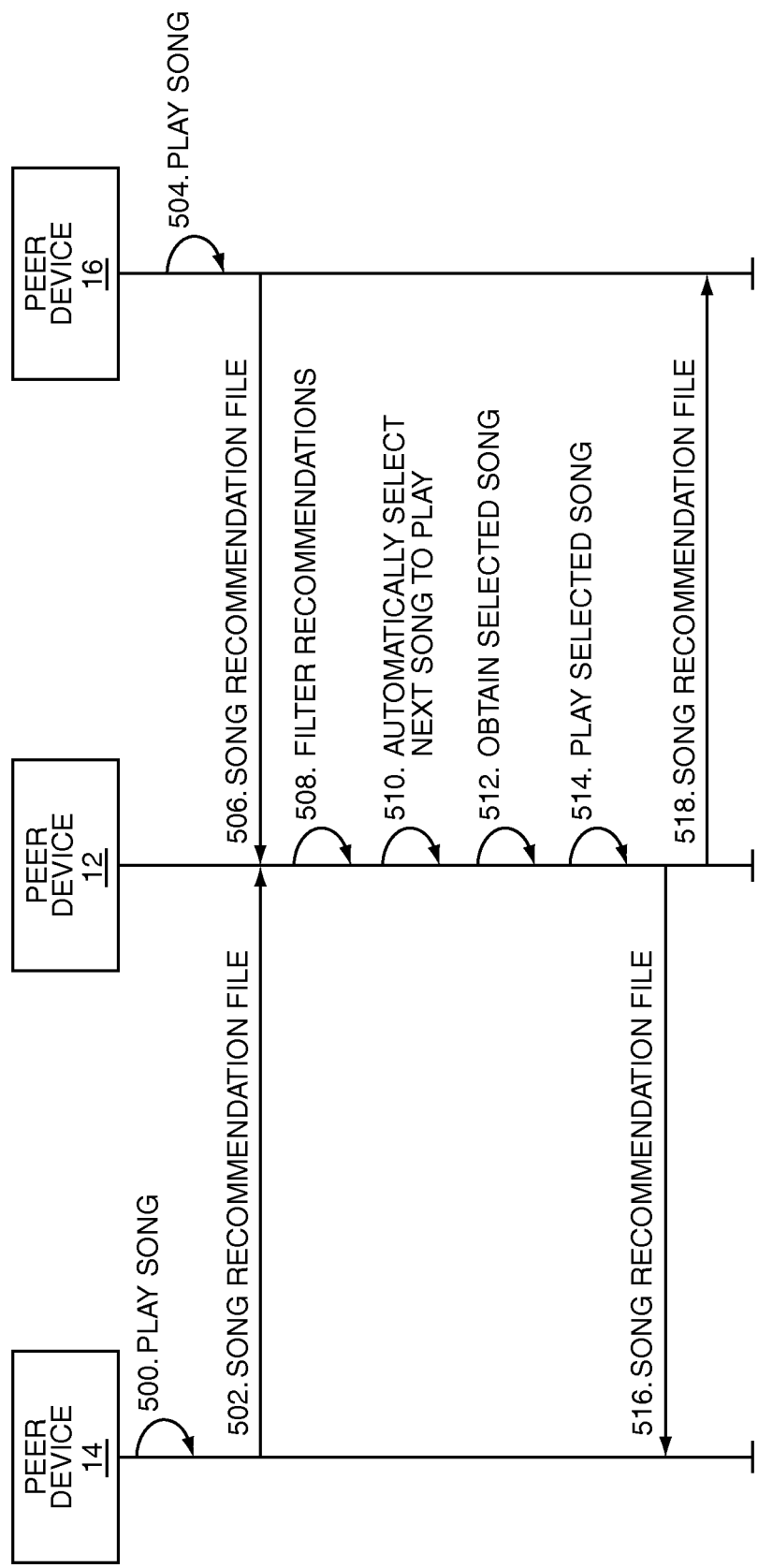
FIG. 5 illustrates the operation of the system of FIG. 1 according to one embodiment of the present invention.

FIG. 5 illustrates the operation of the peer devices 12-16 to provide real time song recommendations according to one embodiment of the present invention. The illustrated process is the same as discussed above with respect to FIG. 4. As such, the details will not be repeated. In general, the peer devices 14, 16 play songs and, in response, provide song recommendations to the peer device 12 (steps 500-506). The peer device 12 may optionally filter the recommendations from the peer devices 14, 16 (step 508). Based on user preferences of the user of the peer device 12, the recommendation engine 24 of the peer device 12 then automatically selects the next song to play from the songs identified by the recommendations, optionally songs identified by prior recommendations from the peer devices 14, 16, and locally stored songs from the music collection 26 (step 510). The peer device 12 then obtains and plays the selected song (steps 512-514). Either prior to, during, or after playback of the selected song, the recommendation engine 24 of the peer device 12 provides a recommendation identifying the selected song to the other peer devices 14, 16 (step 516-518).

Figure 6:
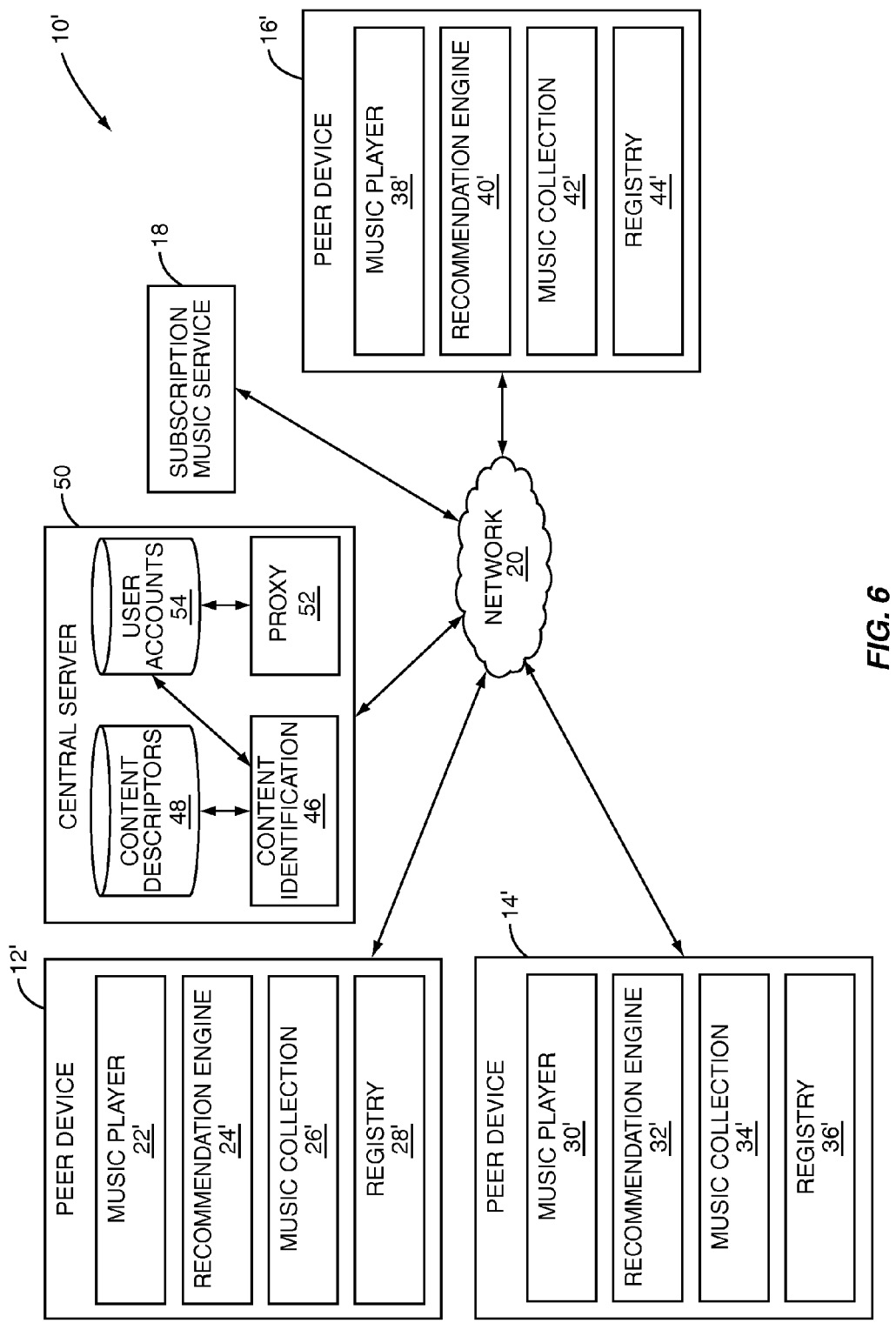
FIG. 6 illustrates a system incorporating a P2P network for real time media recommendations according to a second embodiment of the present invention.

FIG. 6 illustrates the system 10' according to second embodiment of the present invention. In this embodiment, the peer devices 12'-16' form a P2P network via the network 20 and a central server 50. The peer devices 12'-16' may be any device having a connection to the network 20 and audio playback capabilities. For example, the peer devices 12'-16' may be personal computers, laptop computers, mobile telephones, portable audio players, PDAs, or the like having either a wired or wireless connection to the network 20. As discussed above with respect to the peer device 12, the peer device 12' includes a music player 22', a recommendation engine 24', a music collection 26', and a registry 28'. Likewise, the peer device 14' includes a music player 30', a recommendation engine 32', a music collection 34', and registry 36'; and the peer device 16' includes a music player 38', a recommendation engine 40', a music collection 42', and registry 44'.

The central server 50 includes a proxy function 52 and a user accounts database 54. In this embodiment, the central server 50 may also include the content identification function 46 and the content descriptors database 48. It should be noted that in an alternative embodiment, the subscription music service 18, the proxy function 52, and the user accounts database 54, and optionally the content identification function 46 and the content descriptors database 48, may be hosted by the central server 50.

The proxy function 52 may be implemented in software, hardware, or a combination of software and hardware and operates as an intermediary for transferring recommendations among the peer devices 12'-16'. In addition, the proxy function 52 may perform various functions. For example, as discussed below, the proxy function 52 may filter recommendations, generate a list of songs in the music collections 26', 34', and 42' by monitoring the recommendations made by the peer devices 12'-16', and maintain a play history for the peer devices 12'-16' based on recommendations made by the peer devices 12'-16'.

The user accounts database 54 stores account information for the users of the peer devices 12'-16'. Using the peer device 12' as an example, the account information may include, for example, a user profile, a list of songs or at least a portion of the songs in the music collection 26', a play history of the peer device 12', information identifying the subscription music service 18 or a number of similar services to which the user of the peer device 12' is a subscriber, and a "buddy list" of the user. The "buddy list" identifies other users or other peer devices 14'-16' to which the recommendations of the peer device 12' are to be provided and from which the peer device 12' is to receive recommendations.

As discussed above with respect to FIGS. 1 and 2, the content identification function 46 and the content descriptors database 48 may be used to obtain GUIDs for the songs in the music collections 26', 34', and 42' of the peer devices 12', 14', and 16'. More specifically, using the peer device 12' as an example, the peer device 12' may provide identification parameters for each of the songs in the music collection 26' to the central server 50, where the content identification function 46 identifies the songs using the identification parameters and the content descriptors in the content descriptors database 48. The GUIDs for the songs are then returned to the peer device 12'.

In addition to or as an alternative, the GUIDs for the songs in the music collections 26', 34', and 42' may be obtained in various other manners. For example, if the songs are imported from a CD, the peer device 12' may provide information regarding the tracks on the CD to a remote service in order to obtain the GUIDs as well as metadata for the tracks, or songs, imported from the CD. As another example, if the songs are downloaded from a remote content source such as the subscription music service 18, the GUIDs may be provided along with the downloaded songs.

Figure 7:
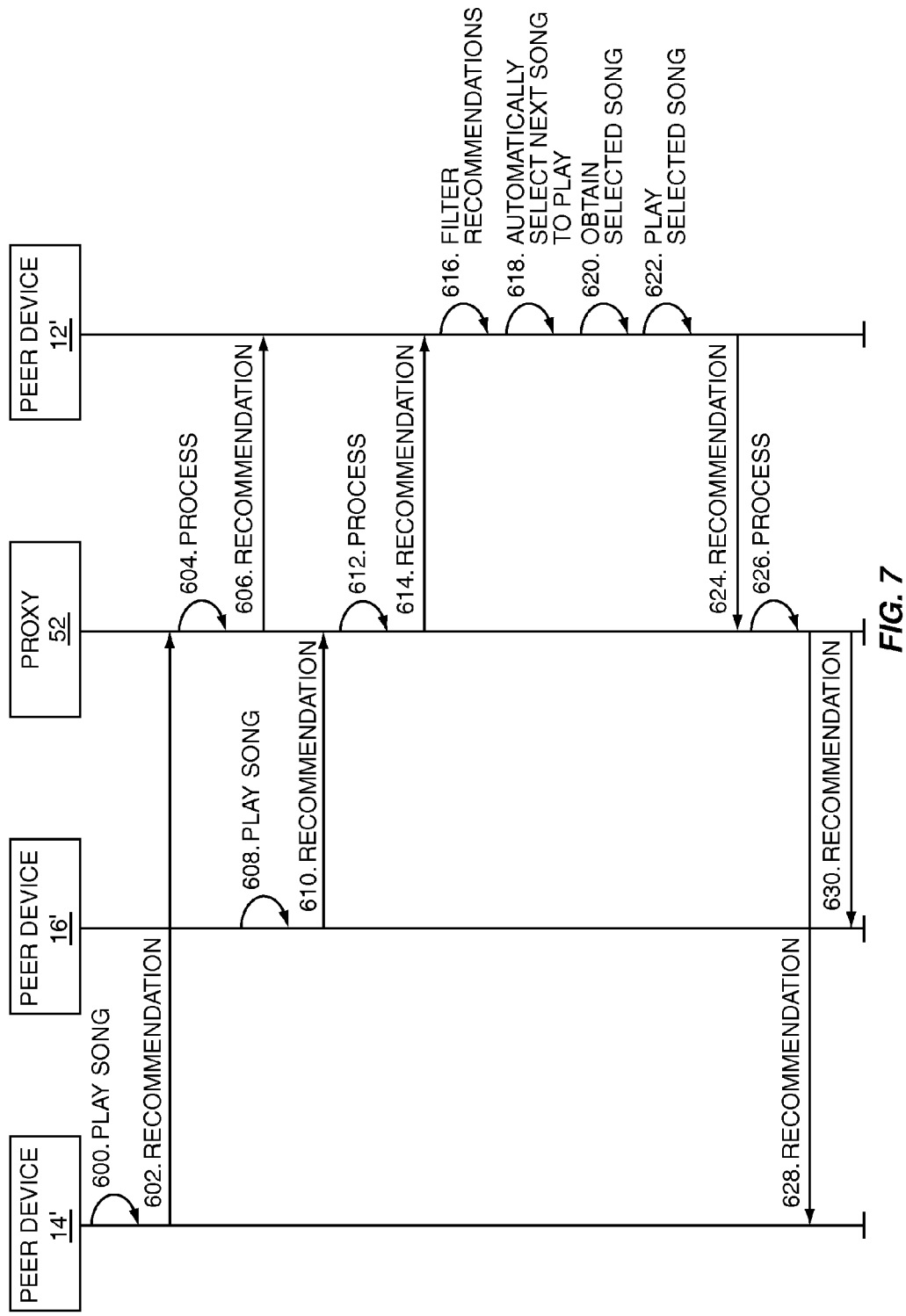
FIG. 7 illustrates the operation of the system of FIG. 6 according to one embodiment of the present invention.

FIG. 7 illustrates the operation of the system 10' of FIG. 6 according to one embodiment of the present invention. Prior to beginning the process, the peer devices 12'-16' form a P2P network. Since the number of peer devices 12'-16' connected to the network 20 may be very large, the peer devices 12'-16' may implement a technique for identifying a desired group of peer devices among which recommendations are to be shared. For example, the group of peers may be identified using, for example, an electronic or verbal invitation. As another example, the peer device 12' may have an associated "buddy list" identifying friends of the user of the peer device 12', where the peer device 12' may automatically establish a P2P network with the peer devices of the users identified by the "buddy list" when the peer devices are connected to the network 20. Alternatively, the peer devices 12'-16' may form an ad-hoc network where the participants for the ad-hoc network are selected based on similarities in user profiles.

In this example, once the P2P network is established, the peer device 14' plays a song and, in response, provides a song recommendation identifying the song to the proxy function 52 of the central server 50 (step 600-602). Optionally, the proxy function 52 may process the recommendation to provide various functions (step 604). Using the peer device 12' as an example, the proxy function 52 may determine whether the recommended song is included in the music collection 26' of the peer device 12' by comparing the GUID from the recommendation to a list of songs, or more specifically, the GUIDs for the songs, in the music collection 26'. The list of songs in the music collection 26' may be stored in the user accounts database 54. The list of songs in the music collection 26' may be generated by the content identification function 46 as a result of the song identification process described above, generated by the proxy function 52 by monitoring recommendations from the peer device 12', or a combination thereof. If the recommendation is for a song that is not part of the music collection 26' of the peer device 12', the proxy function 52 may insert a URL for obtaining the song or a preview of the song from the subscription music service 18 or similar e-commerce service.

The proxy function 52 may additionally or alternatively filter recommendations based on various criteria. For example, the proxy function 52 may filter recommendations such that, for example, the peer device 12' only receives recommendations for songs in the music collection 26' or only receives recommendations for songs in the music collection 26' or accessible to the peer device 12' from a remote content source such as the subscription music service 18 or similar e-commerce service with which the user of the peer device 12' is registered. Optionally, if the user of the peer device 12' thereafter registers with the remote content source, the proxy function 52 may provide previously blocked or removed recommendations to the peer device 12' if desired. The proxy function 52 may also filter the recommendations based on filtering criteria such as, for example, user, genre, artist, title, album, lyrics, date of release, or the like. The filtering criteria may be defined by the users of the peer devices 12'-16'.

The proxy function 52 may also process the recommendation to determine whether the corresponding song is hosted by a remote content source with which the user of the recipient device, which in this example is the peer device 12', is registered. This remote content source is referred to herein as a preferred source. The proxy function 52 may determine whether the song is available from the preferred source. If so, a URL for the song at the remote content source may be inserted into the recommendation. If not, the proxy function 52 may identify another remote content source from which the song is available and insert information enabling the user of the peer device 12' to register with the other remote content source in order to obtain the song. In addition, the proxy function 52 may insert a URL for the song at the other remote content source.

The proxy function 52 may also monitor the recommendations to generate and store a play history for the peer devices 12'-16'. Using the peer device 12' as an example, the play history may include a list of GUIDs and time stamps corresponding to the recommendations received from the peer device 12' and therefore the songs played by the peer device 12'.

The proxy function 52 forwards the recommendation to the peer device 12' (steps 606). While not illustrated for clarity and ease of discussion, the proxy function 52 also sends the recommendation to other desired recipients, where in this example the peer device 16' is another desired recipient. Note that the proxy function 52 may identify the peer devices 12' and 16' to which the recommendation is to be forwarded using, for example, the "buddy list" of the peer device 14' stored in the user accounts database 54. Alternatively, the recommendation from the peer device 14' may identify the desired recipients of the recommendation, which in this example are the peer devices 12' and 16'. As another alternative, if the number of peer devices connected to the network 20 is relatively small, the proxy function 52 may forward the recommendation to all peer devices connected to the network 20.

Like the peer device 14', the peer device 16' also plays a song and sends a song recommendation to the peer device 12' via the proxy function 52 of the central server 50 (steps 608-614). Again, while not illustrated for clarity, the recommendation for the song is also provided to the peer device 14' via the proxy function 52 of the central server 50.

From this point, the process continues as discussed above. More specifically, the recommendation engine 24' may optionally filter the recommendations from the other peer devices 14', 16' (step 616). Note that if the proxy function 52 has already filtered the recommendations, no filtering or limited filtering may be desired at the recommendation engine 24'. Based on user preferences, the recommendation engine 24' then automatically selects a next song to play from the songs identified by the recommendations received from the other peer devices 14'-16', optionally songs identified by previously received recommendations from the peer devices 14'-16', and one or more songs from the music collection 26' (step 618). In the preferred embodiment discussed below, the songs identified by the recommendations from the other peer devices 14'-16' and the songs from the music collection 26' are scored based on the user preferences. Then, based on the scores, the recommendation engine 24' selects the next song to play.

Once the next song to play is selected, the peer device 12' obtains the selected song (step 620). If the selected song is part of the music collection 26', the peer device 12' obtains the selected song from the music collection 26'. If the selected song is not part of the music collection 26', the recommendation engine 24' obtains the selected song from the subscription music service 18, an e-commerce service, or one of the other peer devices 14'-16'. For example, the selected song may be obtained from a source identified in the recommendation for the song. Note that in the one embodiment, the recommendations include the GUIDs of the corresponding songs. In order to determine whether the recommended songs are part of the music collection 26' stored locally by the peer device 12', the peer device 12' may compare the GUIDs from the recommendations to the GUIDs of the songs in the music collection 26' stored in the registry 28'. Once obtained, the selected song is played, and a recommendation for the song is provided to the other peer devices 14'-16' via the proxy function 52 of the central server 50 (steps 622-630).

Returning to step 618, as discussed above, the recommendation engine 24' may provide a download queue for downloading songs or previews of songs using a background process such that the songs or previews will be available when desired to be played. Songs having a score greater than a first threshold that are not already in the music collection 26' are added to the download queue such that the songs are downloaded from a remote content source such as the subscription music service 18 or similar e-commerce service. Note that the recommendations may include URLs for obtaining the songs from the remote content source. Registry entries for the songs may be generated and added to the registry 28' before, during, or after download. Songs having a score less than the first threshold but greater than a second threshold may be added to the download queue such that previews of the songs are downloaded from a remote content source such as the subscription music service 18 or similar e-commerce service. Again, the recommendations for the songs may include URLs for obtaining the previews of the songs from the remote content source.

Figure 8:
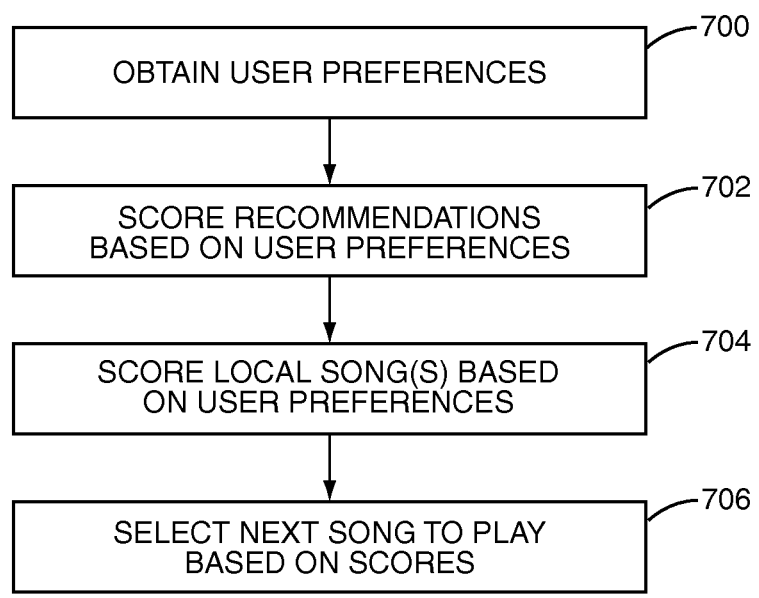
FIG. 8 is a flow chart illustrating a method for automatically selecting media to play based on recommendations from peer devices and user preferences according to one embodiment of the present invention.

FIG. 8 illustrates the process of automatically selecting a song to play from the received recommendations and locally stored songs at the peer device 12' according to one embodiment of the present invention. However, the following discussion is equally applicable to the peer devices 12-16 of FIG. 1, as well as the other peer devices 14'-16' of FIG. 6. First, the user preferences for the user of the peer device 12' are obtained (step 700). The user preferences may include a weight or priority assigned to each of a number of categories such as, but not limited to, user, genre, decade of release, and availability. The user preferences may be obtained from the user during an initial configuration of the recommendation engine 24'. In addition, the user preferences may be updated by the user as desired. The user preferences may alternatively be suggested by the recommendation engine 24' or the central server 50 based on a play history of the peer device 12' and the songs in the music collection 26' of the peer device 12'. Note that the proxy function 52 of the central server 50 may ascertain the play history of the peer device 12' by monitoring the recommendations from the peer device 12' as the recommendations pass through the central server 50. The user preferences may be stored locally at the peer device 12' or remotely at the central server 50 in the user accounts database. If stored remotely, the recommendation engine 24' may obtain the user preferences from the central server 50 when desired.

Once recommendations are received from the other peer devices 14'-16', the recommendation engine 24' of the peer device 12' scores the songs identified by the recommendations based on the user preferences (step 702). The recommendation engine 24' also scores one or more local songs from the music collection 26' (step 704). The recommendation engine 24' then selects the next song to play based, at least on part, on the scores of the recommended and local songs (step 706).

Figure 9:
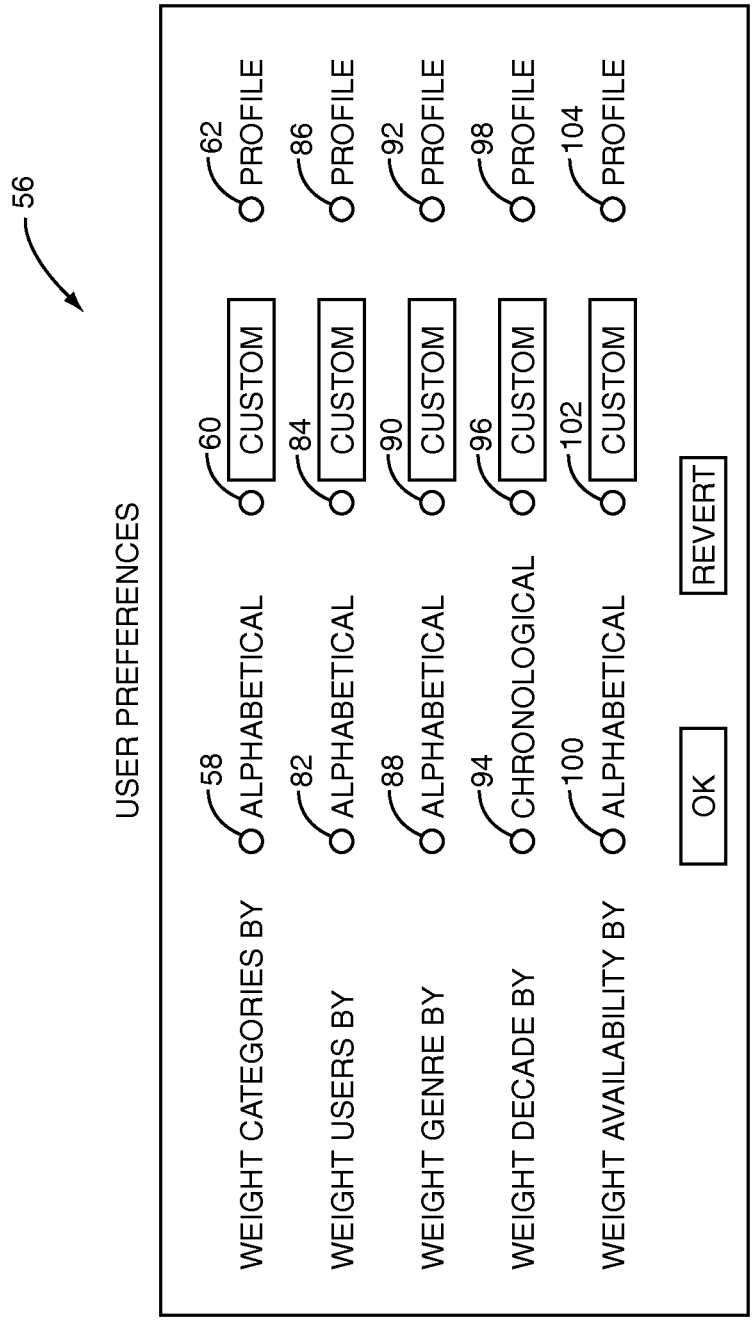
FIG. 9 illustrates an exemplary graphical user interface (GUI) for configuring user preferences according to one embodiment of the present invention.
Figure 10:
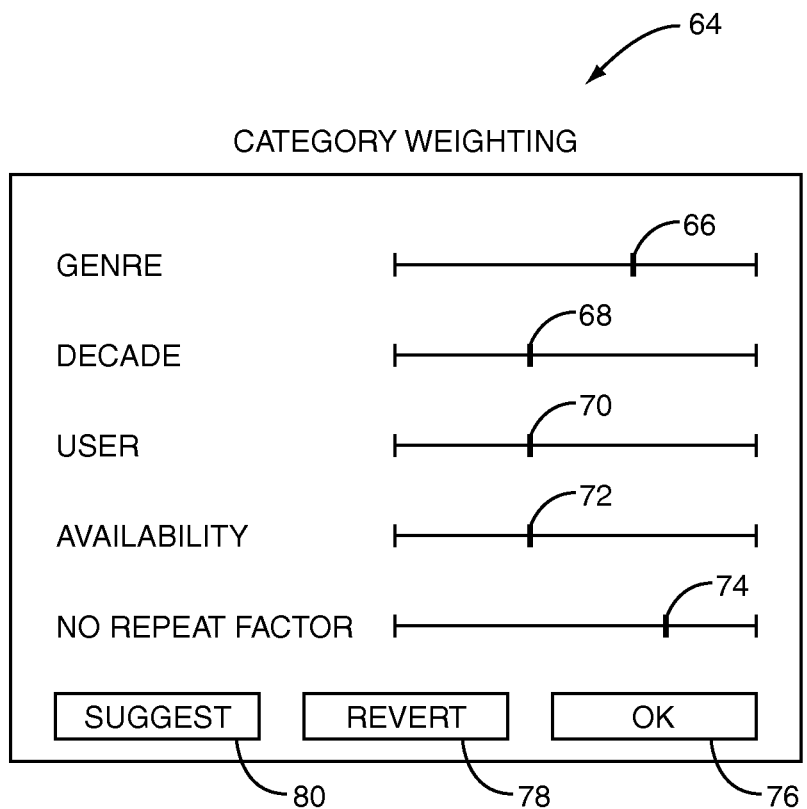
FIG. 10 illustrates an exemplary GUI for assigning weights to various categories of media content as part of configuring the user preferences according to one embodiment of the present invention.

FIG. 9 illustrates an exemplary graphical user interface (GUI) 56 for configuring user preferences. First, the user assigns a weight to various categories. In this example, the categories are users, genre, decade, and availability. However, the present invention is not limited thereto. The weights for the categories may be assigned alphabetically by selecting radio button 58, customized by the user by selecting radio button 60, or automatically suggested based on a user profile of the user by selecting radio button 62. If alphabetical weighting is selected, the weights are assigned by alphabetically sorting the categories and assigning a weight to each of the categories based on its position in the alphabetically sorted list of categories. As illustrated in FIG. 10, if customized weighting is selected, the user may be presented with a GUI 64 for customizing the weighting of the categories. As illustrated in the exemplary embodiment of FIG. 10, the weights of the categories may be assigned by adjusting corresponding sliding bars 66-72. Sliding bar 74 may be adjusted to assign a weight to a "no repeat factor." The no repeat factor is a dampening factor used to alter a song's score based on when the song was previously played at the peer device 12' in order to prevent the same song from being continually repeated.

Once the weights are assigned, the user may select an OK button 76 to return to the GUI 56 of FIG. 9 or select a REVERT button 78 to return the weights of the categories to their previous settings. In addition, the user may select a SUGGEST button 80 to have the recommendation engine 24' or the central server 50 suggest weights for the categories based on a user profile of the user, a play history for the peer device 12', the songs in the music collection 26' of the peer device 12', or the like or any combination thereof. Note that the SUGGEST button 80 has the same effect as the radio button 62 of FIG. 9.

Returning to FIG. 9, radio buttons 82-86 are used to select a desired method for assigning weights to each user in the P2P network, radio buttons 88-92 are used to select a desired method for assigning weights to each of a number of genres of music, radio buttons 94-98 are used to select the desired method for assigning weights to each of a number of decades, and radio buttons 100-104 are used to select the desired method for assigning weights to a number of song availability types.

Figure 11:
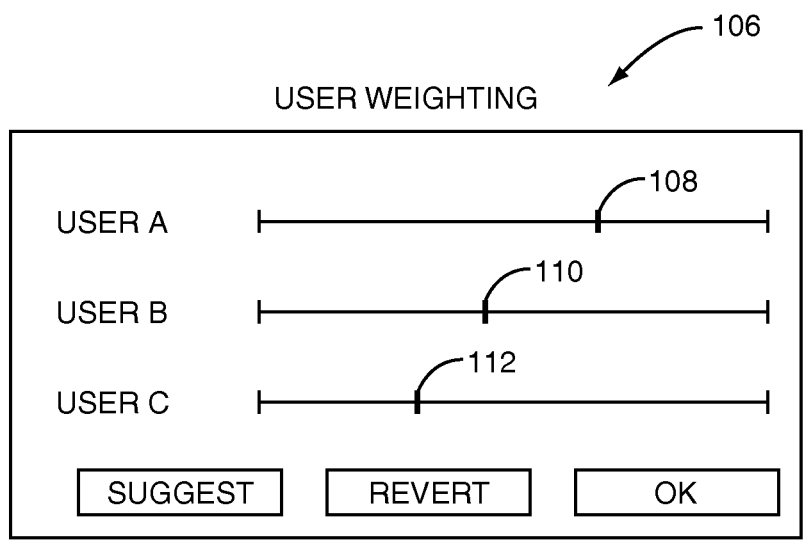
FIG. 11 illustrates an exemplary GUI for assigning weights to individual users within a user category as part of configuring the user preferences according to one embodiment of the present invention.

Regarding users, if the radio button 82 is selected, the users are assigned weights based on their respective positions in an alphabetically sorted list of users. If the radio button 84 is selected, a GUI 106 (FIG. 11) is provided enabling the user to customize the weights assigned to a number of users from which recommendations are received. An exemplary embodiment of the GUI 106 is illustrated in FIG. 11, where sliding bars 108-112 enable the user to assign customized weights to corresponding users. Returning to FIG. 9, if the radio button 86 is selected, the recommendation engine 24' or the central server 50 generates suggested weights for the users based on the user profiles for the user and the user profile of the user associated with the peer device 12', the play history of the user and the play history of the user of the peer device 12', the songs in the music collections of the user and the songs in the music collection 26' of the user of the peer device 12', or the like or any combination thereof.

Figure 12:
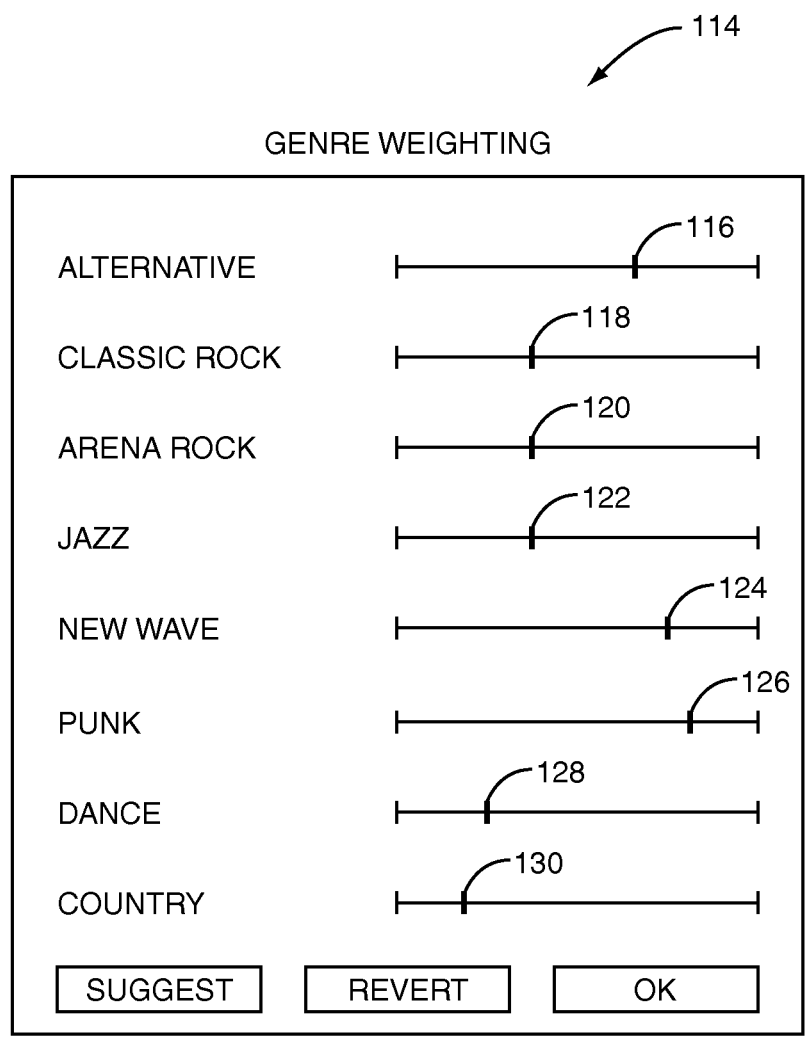
FIG. 12 illustrates an exemplary GUI for assigning weights to individual genres from a genre category as part of configuring the user preferences according to one embodiment of the present invention.

Regarding genres, if the radio button 88 is selected, the genres are assigned weights based on their respective positions in an alphabetically sorted list of genres. If the radio button 90 is selected, a GUI 114 (FIG. 12) is provided enabling the user to customize the weights assigned to a number of genres. An exemplary embodiment of the GUI 114 is illustrated in FIG. 12, where sliding bars 116-130 enable the user to assign customized weights to corresponding genres. Returning to FIG. 9, if the radio button 92 is selected, the recommendation engine 24' or the central server 50 generates suggested weights for the genres based on the user profile associated with the peer device 12', the play history of the peer device 12', the songs in the music collection 26', or the like or any combination thereof.

Figure 13:
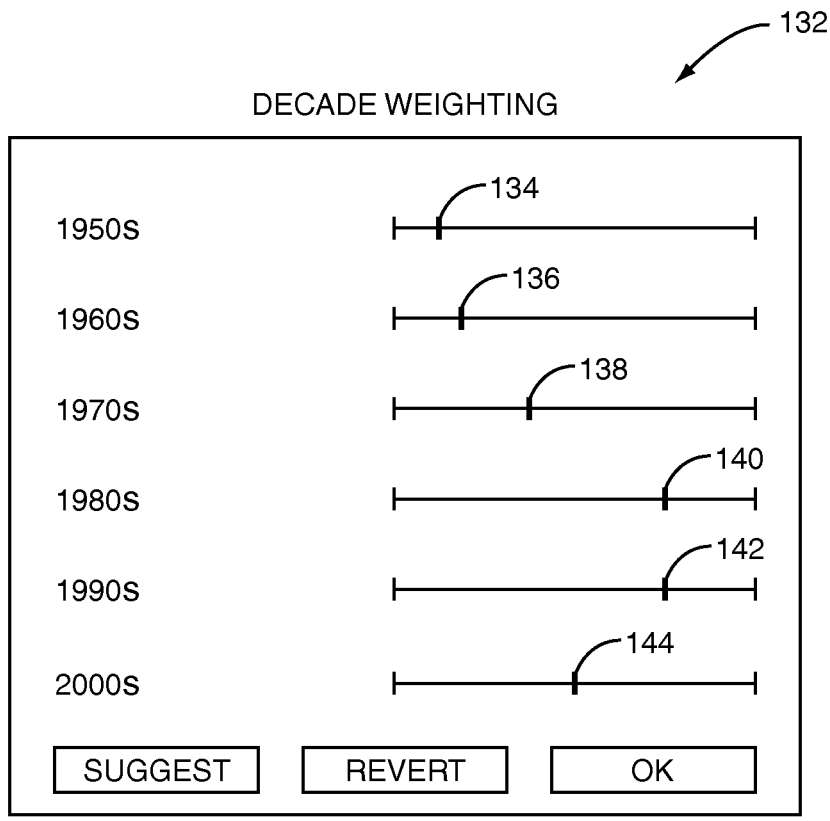
FIG. 13 illustrates an exemplary GUI for assigning weights to individual decades from a decade category as part of configuring the user preferences according to one embodiment of the present invention.

Regarding decades, if the radio button 94 is selected, the decades are assigned weights based on their respective positions in a chronologically sorted list of decades. If the radio button 96 is selected, a GUI 132 (FIG. 13) is provided enabling the user to customize the weights assigned to a number of decades. An exemplary embodiment of the GUI 132 is illustrated in FIG. 13, where sliding bars 134-144 enable the user to assign customized weights to corresponding decades. Returning to FIG. 9, if the radio button 98 is selected, the recommendation engine 24' or the central server 50 generates suggested weights for the decades based on the user profile associated with the peer device 12', the play history of the peer device 12', the songs in the music collection 26', or the like or any combination thereof.

Figure 14:
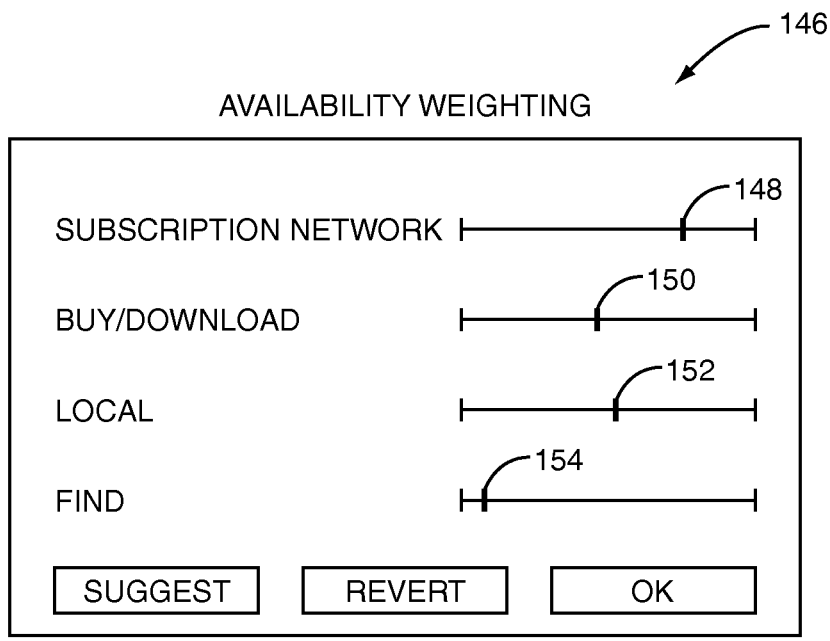
FIG. 14 illustrates an exemplary GUI for assigning weights to individual availability types from an availability type category as part of configuring the user preferences according to one embodiment of the present invention.

Regarding availability, if the radio button 100 is selected, the availability types are assigned weights based on their respective positions in an alphabetically sorted list of availability types. If the radio button 102 is selected, a GUI 146 (FIG. 14) is provided enabling the user to customize the weights assigned to a number of availability types. An exemplary embodiment of the GUI 146 is illustrated in FIG. 14, where sliding bars 148-154 enable the user to assign customized weights to corresponding availability types. Returning to FIG. 9, if the radio button 104 is selected, the recommendation engine 24' or the central server 50 generates suggested weights for the availability types based on the user profile associated with the peer device 12', whether the user of the peer device 12' has access to the subscription music service 18, or the like or any combination thereof.

An exemplary equation for scoring a particular song is:

$$\text{Score} = \text{NRF} \cdot (W_U \cdot W_{UA} + W_G \cdot W_{GA} + W_D \cdot W_{DA} + W_A \cdot W_{AA}) \cdot 100,$$

where NRF is the "no repeat factor"; $W_U$ is the weight assigned to the user category; $W_{UA}$ is the weight assigned to the user attribute of the song, which is the user recommending the song; $W_G$ is the weight assigned to the genre category; $W_{GA}$ is the weight assigned to the genre attribute of the song, which is the genre of the song; WD is the weight assigned to the decade category; WDA is the weight assigned to the decade attribute of the song, which is the decade in which the song or the album associated with the song was released; WA is the weight assigned to the availability category; and WAA is the weight assigned to the availability attribute of the song, which is the availability of the song.

The NRF may, for example, be computed as:

$$NRF = \frac{MIN(10 \cdot NRFW, LASTREPEAT\_INDEX)}{10 \cdot NRFW}.$$

As an example, assume that the following category weights have been assigned:

| User Category | 1 |
| Genre Category | 7 |
| Decade Category | 7 |
| Availability Type Category | 5 |
| NRFW | 9 |

Further assume that the attributes for the categories have been assigned weights as follows:

| User | | Genre | | Decade | | Availability | |
|---|---|---|---|---|---|---|---|
| User A | 5 | Alternative | 8 | 1950s | 2 | Local | 8 |
| User B | 5 | Classic Rock | 5 | 1960s | 4 | Subscription Network | 2 |
| User C | 5 | Arena Rock | 5 | 1970s | 7 | Buy/Download | 1 |
| | | Jazz | 5 | 1980s | 9 | Find | 1 |
| | | New Wave | 2 | 1990s | 5 | | |
| | | Punk | 4 | 2000s | 5 | | |
| | | Dance | 2 | | | | |
| | | Country | 2 | | | | |

Thus, if a particular song to be scored is recommended by the user "User C," is from the "Alternative Genre," is from the "1980s" decade, and is available from the subscription music service 18, the score of the song may be computed as:

$$Score = NRF \cdot \left(\frac{1}{20} \cdot \frac{5}{10} + \frac{7}{20} \cdot \frac{8}{10} + \frac{7}{20} \cdot \frac{9}{10} + \frac{5}{20} \cdot \frac{2}{10}\right) \cdot 100$$

where if the song was last played 88 songs ago, $$NRF = \frac{MIN(10 \cdot 9, 88)}{10 \cdot 9} = \frac{88}{90}.$$

Thus, the score for the song is $$Score = \frac{88}{90} \cdot \left(\frac{1}{20} \cdot \frac{5}{10} + \frac{7}{20} \cdot \frac{8}{10} + \frac{7}{20} \cdot \frac{9}{10} + \frac{5}{20} \cdot \frac{2}{10}\right) \cdot 100 = 65.5.$$

FIG. 15 is an exemplary GUI 156 showing a playlist for the peer device 12' including both local and recommended songs according to the present invention. However, note that a similar list may be maintained internally by the peer device 12 of FIG. 1 and potentially optimized to display at least a portion of the GUI 156 on the display of the peer device 12. In this example, both the local and recommended songs are scored, as described above, and sorted according to their scores. In addition, as illustrated in FIG. 16, the songs may be sorted based on another criterion, which in the illustrated example is genre.

The GUI 156 may optionally allow the user to block songs having particular identified fields. In the examples of FIGS. 14 and 15, the user has identified the genre "country" and the artist "iron maiden" as fields to be blocked, as illustrated by the underlining. The user may select fields to block by, for example, clicking on or otherwise selecting the desired fields. Songs having the blocked fields are still scored but are not obtained or played by the peer device 12'.

As discussed above, in one embodiment, the recommendation engine 24' of the peer device 12' may provide a download queue containing all songs to be downloaded, and optionally purchased, from an external source such as the subscription music service 18, an e-commerce service, or another peer device 14'-16'. Songs in the download queue having scores above a first predetermined or user defined threshold and previews of other songs in the download queue having scores above a second predetermined or user defined threshold but below the first threshold may be automatically downloaded to the peer device 12'.

Figure 17:
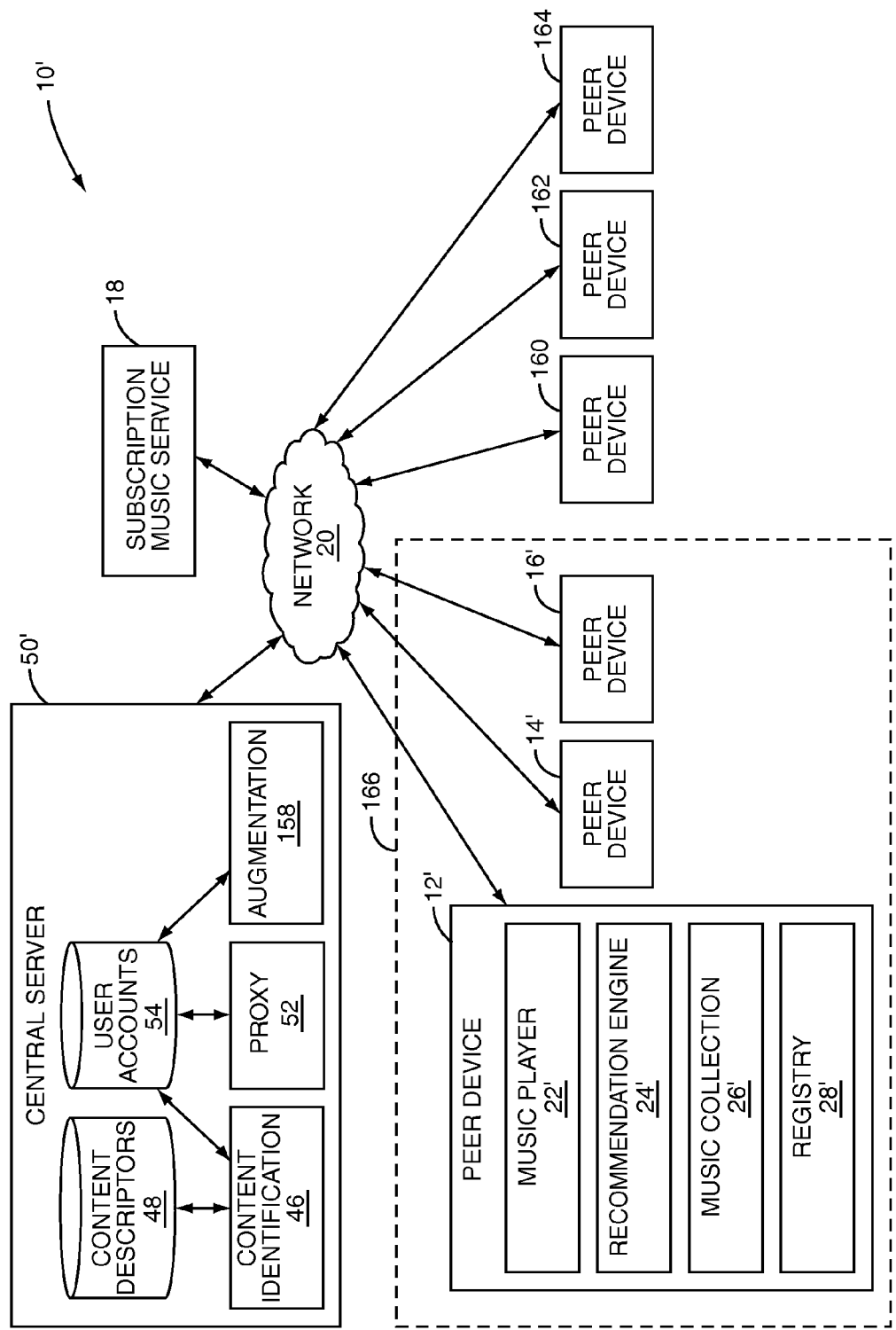
FIG. 17 illustrates a system incorporating a P2P network for real time media recommendations according to a second embodiment of the present invention.

FIG. 17 illustrates the system 10' of FIG. 6 according to another embodiment of the present invention. In general, the central server 50' of this embodiment additionally includes an augmentation function 158. Using the peer device 12' as an example, the augmentation function 158 generally operates to augment, or supplement, recommendations provided to the peer device 12' when a recommendation level for the peer device 12' falls below a defined minimum recommendation level.

As illustrated, the system 10' includes the peer devices 12'-16' and a number of additional peer devices 160-164. In this example, the peer devices 12'-16' form a P2P group 166 for exchanging recommendations in the manner described above. The additional peer devices 160-164 are like the peer devices 12'-16' but are not part of the P2P group 166. For example, the additional peer devices 160-164 may not be included in the "buddy list" of the peer device 12'. As discussed below, in one embodiment, the additional peer devices 160-164 may be used to augment recommendations provided to the peer devices 12'-16'.

Before describing the operation of the augmentation function 158, it should be noted that minimum recommendation levels are defined for the peer devices 12'-16'. As used herein, a "recommendation level" may be defined as the number of active, online peer devices sending recommendations to a peer device. An active, online peer device is a peer device that is connected to the network 20 and actively playing songs and sending recommendations. Thus, if the peer device 12' is connected to the network 20 but is not playing songs and therefore not sending recommendations, the peer device 12' is not "active." "Recommendation level" may alternatively be defined as a number of recommendations received by a peer device over a defined period of time such as, for example, a song selection period. A song selection period is the period of time between the automatic selection of a song and the automatic selection of the next song which is generally the duration of the selected song.

The minimum recommendation levels may be defined by the users of the peer devices 12'-16'. Alternatively, the minimum recommendation levels may be defined by the central server 50' based on the number of peer devices in the P2P group 166. For example, if the "buddy list" of the peer device 12' includes only the peer devices 14' and 16', the minimum recommendation level for the peer device 12' may be defined as 2 or the number of recommendations normally provided by two peer devices.

The minimum recommendation levels for the peer devices 12'-16' are stored in the user accounts database 54. More specifically, using the peer device 12' as an example, the user account for the user of the peer device 12' may include the minimum recommendation level for the peer device 12'. The user account may also include a flag indicating whether the peer device 12' or associated user account information such as the user profile of the user of the peer device 12', the user preferences of the user of the peer device 12', the list of songs in the music collection 26', and the play history of the peer device 12' may be used by the augmentation function 158 to augment recommendations for other peer devices such as the additional peer devices 160-164.

Figure 18:
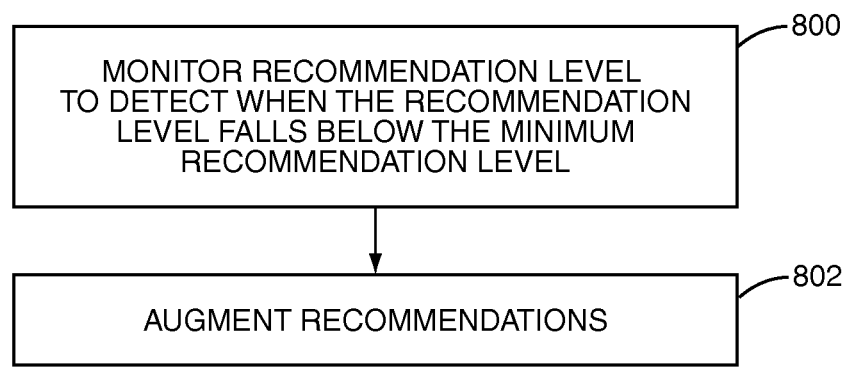
FIG. 18 illustrates the operation of the central server to maintain a desired level of real time media recommendations in the absence of active, online friends according to a second embodiment of the present invention.

FIG. 18 illustrates the operation of the augmentation function 158 according to one embodiment of the present invention. While the following discussion uses the peer device 12' as an example, the discussion is equally applicable to the other peer devices 14'-16' and 160-164. The augmentation function 158 monitors the recommendation level for the peer device 12' to detect when the recommendation level for the peer device 12' falls below the minimum recommendation level for the peer device 12' (step 800). In one embodiment, the recommendation level is defined as the number of active, online peers from which the peer device 12' is receiving recommendations. Thus, the augmentation function 158 may monitor the recommendation level of the peer device 12' by monitoring a status of each of the peer devices 14', 16'. As used herein, the status of, for example, the peer device 14' indicates whether the peer device 14' is connected to the network 20, or online, and whether the peer device 14' is actively sending recommendations to the central server 50'. Normally, if both of the peer devices 14' and 16' in the P2P group 166 are online and sending recommendations, the recommendation level for the peer device 12' is 2. Thus, if one of the peer devices 14', 16' is offline or inactive, then the recommendation level for the peer device 12' is 1. If the peer device 14' is offline or inactive and the peer device 16' is offline or inactive, then the recommendation level for the peer device 12' is 0. Assuming that the minimum recommendation level for the peer device 12' is 2, the augmentation function 158 detects that the recommendation level for the peer device 12' has fallen below the minimum recommendation level when the peer device 14' is offline or inactive, when the peer device 16' is offline or inactive, or when the peer device 14' and the peer device 16' are both offline or inactive.

In another embodiment, the recommendation level is defined as the number of recommendations provided to the peer device 12' over a defined period of time. The defined period of time may be, for example, a song selection period substantially corresponding to a period of time between selecting songs to play at the peer device 12'. In this example, since the peer device 12' normally receives recommendations from the two peer devices 14' and 16', the minimum recommendation level may be defined as two recommendations per song selection period. The augmentation function 158 detects that the recommendation level for the peer device 12' has fallen below the minimum recommendation level when the number of recommendations over the defined period of time is less than the minimum recommendation level.

In response to detecting that the recommendation level for the peer device 12' is less than the minimum recommendation level for the peer device 12', the augmentation function 158 augments the recommendations provided to the peer device 12' with additional recommendations such that the recommendation level for the peer device 12' is increased to or above the minimum recommendation level for the peer device 12' (step 802). The manner in which the augmentation function 158 augments the recommendations for the peer device 12' vary depending on the particular implementation.

In a first embodiment, the augmentation function 158 selects one or more of the additional peer devices 160-164 that is online and active and uses the recommendations from the one or more selected peer devices to augment the recommendations provided to the peer device 12'. More specifically, if the peer device 16' is offline or inactive, the augmentation function 158 may desire to select one of the additional peer devices 160-164 for augmenting the recommendations from the remaining peer device 14' to provide augmented recommendations to the peer device 12' at or above the minimum recommendation level. The augmentation function 158 may select one of the additional peer devices 160-164 based on a comparison of the user profiles of the users of the additional peer devices 160-164, the music collections of the additional peer devices 160-164, the play histories of the additional peer devices 160-164, the user preferences of the users of the additional peer devices 160-164, or any combination thereof to the corresponding information for the peer device 12' or alternatively the corresponding information for the peer devices 16' that is offline or inactive.

In a second embodiment, the augmentation function 158 augments the recommendations for the peer device 12' using the play histories of the offline or inactive peer devices in the group 166. For example, if the peer device 16' is offline or inactive, the augmentation function 158 may use the play history of the peer device 16' to provide additional recommendations. The additional recommendations may then be used to augment, or supplement, the recommendations from the peer device 14' to provide augmented recommendations at or above the minimum recommendation level for the peer device 12'.

In a third embodiment, the augmentation function 158 augments the recommendations for the peer device 12' by generating additional recommendations based on the user profiles of the offline or inactive peer devices in the P2P group 166. The user profile used to generate the additional recommendations may include information identifying the user of the peer device 16', demographic information regarding the user of the peer device 16', and statistical information describing the music collection 42' of the peer device 16' and/or the songs in the play history of the peer device 16'. The statistical information describing the music collection 42' of the peer device 16' may include, for example, a genre distribution, an artist distribution, a release year distribution, or the like or any combination thereof. The genre distribution may be generated by computing, for each genre, the number of songs in the music collection 42' in that genre divided by a total number of songs in the music collection 42'. The artist distribution and release year distributions may be generated in using a similar algorithm.

For example, if the peer device 16' is offline or inactive, the augmentation function 158 may generate additional recommendations based on the user profile for the peer device 16'. As will be apparent to one of ordinary skill in the art, a number of recommendation algorithms for recommending songs based on a user profile are known and are not the subject of this specification. Any applicable recommendation algorithm may be used to generate the additional recommendations based on the user profile for the peer device 16'. In operation, the augmentation function 158 may recommend a number of songs from, for example, a favorite genre of the user of the peer device 16', where the favorite genre may be identified using the user profile. The additional recommendations are used to supplement the recommendations from the peer device 14' to provide augmented recommendations to the peer device 12' at a level equal to or greater than the minimum recommendation level for the peer device 12'.

In a fourth embodiment, the augmentation function 158 augments the recommendations for the peer device 12' by generating additional recommendations based on a user profile for the peer device 12'. Any applicable recommendation algorithm may be used to generate the additional recommendations based on the user profile for the peer device 16'. In operation, if, for example, the peer device 16' is offline or inactive, the augmentation function 158 generates a number of additional recommendations for songs from, for example, a favorite genre of the user of the peer device 12', where the favorite genre may be identified using the user profile. The additional recommendations are used to supplement the recommendations from the peer device 14' to provide augmented recommendations to the peer device 12' at a level equal to or greater than the minimum recommendation level for the peer device 12'.

Note that while the four different augmentation schemes for the augmentation function 158 are separately described above, the augmentation function 158 may use any combination of the four augmentation schemes. Further, the four augmentation schemes described above are exemplary and are not intended to limit the scope of the present invention.

FIG. 19 is a block diagram of an exemplary embodiment of the peer device 12 of FIG. 1. However, the following discussion is equally applicable to the other peer devices 14, 16. In general, the peer device 12 includes a control system 168 having associated memory 170. In this example, the music player 22 and the recommendation engine 24 are at least partially implemented in software and stored in the memory 170. The peer device 12 also includes a storage unit 172 operating to store the music collection 26 (FIG. 1). The storage unit 172 may be any number of digital storage devices such as, for example, one or more hard-disc drives, one or more memory cards, RAM, one or more external digital storage devices, or the like. The music collection 26 may alternatively be stored in the memory 170. The peer device 12 also includes a communication interface 174. The communication interface 174 includes a local wireless communication interface for establishing the P2P network with the other peer devices 14, 16. The local wireless interface may operate according to, for example, one of the suite of IEEE 802.11 standards, the Bluetooth standard, or the like. The communication interface 174 may also include a network interface communicatively coupling the peer device 12 to the network 20 (FIG. 1). The peer device 12 also includes a user interface 176, which may include components such as a display, speakers, a user input device, and the like.

FIG. 20 is a block diagram of an exemplary embodiment of the peer device 12' of FIG. 6. However, the following discussion is equally applicable to the other peer devices 14'-16'. In general, the peer device 12' includes a control system 178 having associated memory 180. In this example, the music player 22' and the recommendation engine 24' are at least partially implemented in software and stored in the memory 180. The peer device 12' also includes a storage unit 182 operating to store the music collection 26' (FIG. 6). The storage unit 182 may be any number of digital storage devices such as, for example, one or more hard-disc drives, one or more memory cards, RAM, one or more external digital storage devices, or the like. The music collection 26' may alternatively be stored in the memory 180. The peer device 12' also includes a communication interface 184. The communication interface 184 includes a network interface communicatively coupling the peer device 12' to the network 20 (FIG. 6). The peer device 12' also includes a user interface 186, which may include components such as a display, speakers, a user input device, and the like.

Figure 21:
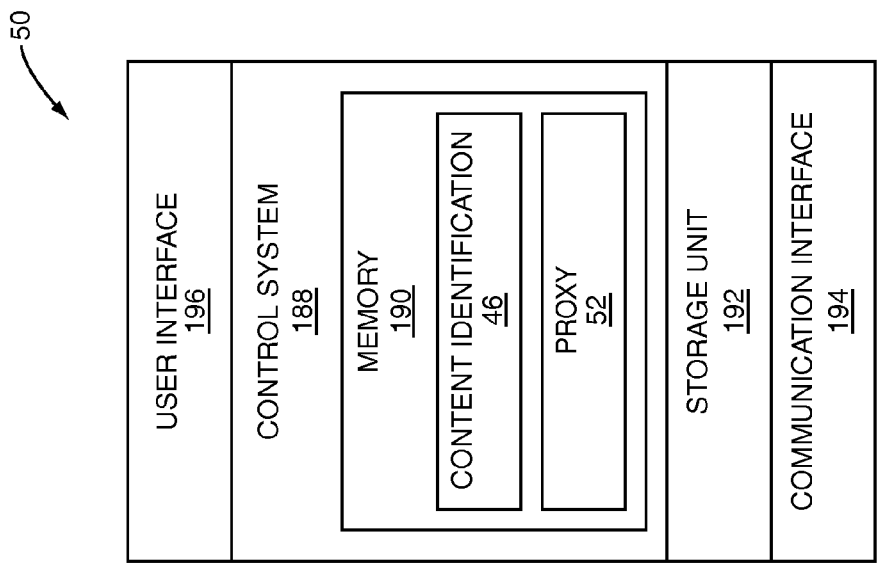
FIG. 21 is a block diagram of the central server of FIG. 6 according to one embodiment of the present invention.

FIG. 21 is a block diagram of an exemplary embodiment of the central server 50 of FIG. 6. In general, the central server 50 includes a control system 188 having associated memory 190. In this example, the content identification function 46 and the proxy function 52 are at least partially implemented in software and stored in the memory 190. The central server 50 also includes a storage unit 192 operating to store, for example, the content descriptors database 48 and the user accounts database 54 (FIG. 6). The storage unit 192 may be any number of digital storage devices such as, for example, one or more hard-disc drives, one or more memory cards, RAM, one or more external digital storage devices, or the like. The central server 50 also includes a communication interface 194. The communication interface 194 includes a network interface communicatively coupling the central server 50 to the network 20 (FIG. 6). The central server 50 may also include a user interface 196, which may include components such as a display, speakers, a user input device, and the like.

Figure 22:
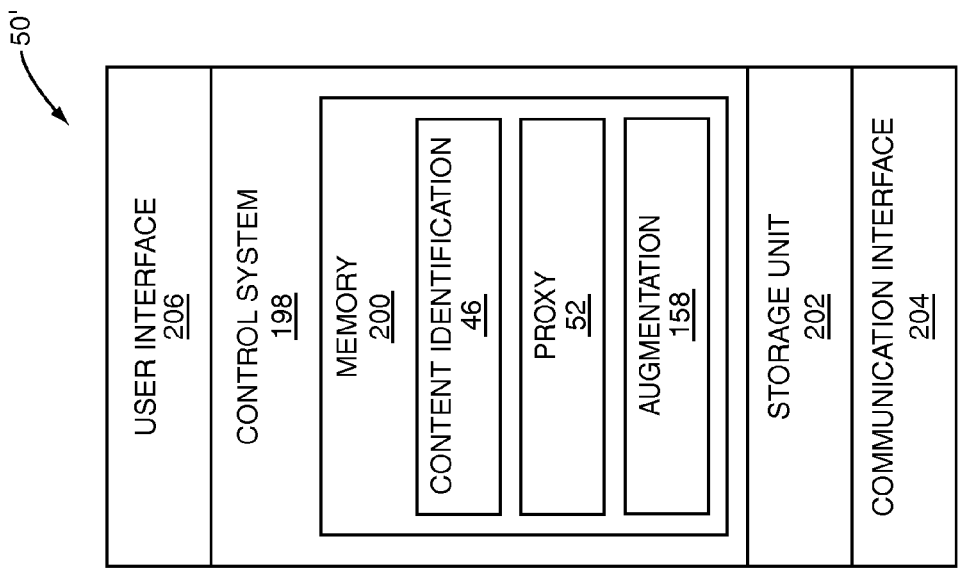
FIG. 22 is a block diagram of the central server of FIG. 17 according to one embodiment of the present invention.

FIG. 22 is a block diagram of an exemplary embodiment of the central server 50' of FIG. 17. In general, the central server 50' includes a control system 198 having associated memory 200. In this example, the content identification function 46, the proxy function 52, and the augmentation function 158 are at least partially implemented in software and stored in the memory 200. The central server 50' also includes a storage unit 202 operating to store, for example, the content descriptors database 48 and the user accounts database 54 (FIG. 17). The storage unit 202 may be any number of digital storage devices such as, for example, one or more hard-disc drives, one or more memory cards, RAM, one or more external digital storage devices, or the like. The central server 50' also includes a communication interface 204. The communication interface 204 includes a network interface communicatively coupling the central server 50' to the network 20 (FIG. 17). The central server 50' may also include a user interface 206, which may include components such as a display, speakers, a user input device, and the like.

The present invention provides substantial opportunity for variation without departing from the spirit or scope of the present invention. For example, while FIG. 1 illustrates the peer devices 12-16 forming the P2P network via local wireless communication and FIG. 6 illustrates the peer devices 12'-16' forming the P2P network via the network 20, the present invention is not limited to either a local wireless P2P network or a Wide Area Network (WAN) P2P network in the alternative. More specifically, a particular peer device, such as the peer device 12, may form a P2P network with other peer devices using both local wireless communication and the network 20. Thus, for example, the peer device 12 may receive recommendations from both the peer devices 14, 16 (FIG. 1) via local wireless communication and from the peer devices 14'-16' (FIG. 6) via the network 20.

As another example, while the discussion herein focuses on song recommendations, the present invention is not limited thereto. The present invention is equally applicable to recommendations for other types of media presentations such as video presentations. Thus, the present invention may additionally or alternatively provide movie recommendations, television program recommendations, or the like.

Further, with respect to the play histories of the peer devices 12'-16' ascertained and stored by the central server 50, the central server 50 may provide additional services using the play histories. For example, the user of the peer device 12' may desire to listen to the songs that he previously listened to at some point in time. For example, the user may desire to listen to the same songs that he listened to one year ago. If so, the peer device 12'-16' may request the play history for the peer device 12' or another peer device associated with the user from one year ago. As another example, the user may desire to listen to, for example, the same songs that a friend or celebrity listened to at some time in the past. For example, the user may desire to listen to the songs that a famous musician was listening to six months ago. The central server 50 may provide the desired play history in the form of, for example, the GUIDs for corresponding songs and optionally URLs for obtaining the songs from a remote content source such as the subscription music service 18 or similar e-commerce service. The peer device 12' may then obtain ones of the songs not in the music collection 26' from the remote content source.

Those skilled in the art will recognize improvements and modifications to the preferred embodiments of the present invention. All such improvements and modifications are considered within the scope of the concepts disclosed herein and the claims that follow.

What is claimed is:

1. A method comprising:
storing, on a peer device, a pre-existing list of media presentations including a plurality of pre-existing media presentations;
receiving, by the peer device, a plurality of media recommendations sent from a plurality of recommending peer devices in response to a media presentation identified by the media recommendation being played on one of the plurality of
recommending peer devices, wherein each of the plurality of media recommendations comprises an identifier that identifies a recommended media presentation;
automatically adding each recommended media presentation to the pre-existing list of pre-existing media presentations, each recommended media presentation added to the pre-existing list of pre-existing media presentations in a position determined based user preferences to form an updated list of media presentations;
automatically selecting, based on the position of each of the media presentations, a selected media presentation to play on the peer device from the updated list of media presentations; and
playing the selected media presentation on the peer device.

2. The method of claim 1 wherein the identifier comprises a Globally Unique Identifier (GUID).

3. The method of claim 2 further comprising:
comparing the GUID from each of the plurality of media recommendations to GUIDs for a plurality of locally stored media presentations to determine whether each of the plurality of media presentations is stored locally by the peer device; and
obtaining at least one of the plurality of media presentations that is not stored locally from a remote content source.

4. The method of claim 3 wherein the plurality of media recommendations further comprise references to the plurality of media presentations at the remote content source, and obtaining the ones of the plurality of media presentations comprises obtaining the at least one of the plurality of media presentations from the remote content source using the references.

5. The method of claim 4 wherein receiving the plurality of media recommendations comprises receiving the plurality of media recommendations from the plurality of recommending peer devices via a central server, wherein the central server inserts the references to the plurality of media presentations at the remote content source.

6. The method of claim 2 further comprising:
comparing the GUID from each of the plurality of media recommendations to GUIDs for a plurality of locally stored media presentations to determine whether each of the plurality of media presentations is stored locally by the peer device; and
obtaining a preview for at least one of the plurality of media presentations that is not stored locally.

7. The method of claim 6 wherein the plurality of media recommendations further comprise references to previews of the plurality of media presentations at the remote content source, and obtaining the preview of the at least one of the plurality of media presentations comprises obtaining the preview from the remote content source using the references.

8. The method of claim 7 wherein receiving the plurality of media recommendations comprises receiving the plurality of media recommendations from the plurality of recommending peer devices via a central server, wherein the central server inserts the references to the preview of the at least one of the plurality of media presentations at the remote content source.

9. The method of claim 1 further comprising filtering the plurality of media recommendations to provide filtered media recommendations, wherein automatically selecting the media presentation comprises automatically selecting the media presentation to play from a group of media presentations including the media presentations identified by the filtered media recommendations.

10. The method of claim 9 wherein filtering the plurality of media recommendations comprises filtering the plurality of media recommendations to remove media recommendations for media presentations that are not stored locally.

11. The method of claim 9 wherein filtering the plurality of media recommendations comprises filtering the plurality of media recommendations to remove media recommendations for media presentations that are not stored locally and are not accessible from a remote content source.

12. The method of claim 1 wherein receiving the plurality of media recommendations comprises receiving the plurality of media recommendations from the plurality of recommending peer devices via a central server, wherein the central server filters the plurality of media recommendations prior to sending the plurality of media recommendations to the peer device.

13. The method of claim 1 further comprising:
receiving the plurality of media recommendations comprises receiving the plurality of media recommendations from the plurality of recommending peer devices via a central server.

14. A peer device comprising:
a communication interface communicatively coupling the peer device to a plurality of peer user devices via a communication network, and configured to receive a plurality of media recommendations sent from a plurality of recommending peer devices in response to a media presentation identified by the media recommendation being played on one of the plurality of recommending peer devices, wherein each of the plurality of media recommendations comprises an identifier that identifies a recommended media presentation;
a control system associated with the communication interface and adapted to:
store a pre-existing list of media presentations including a plurality of pre-existing media presentations;

automatically add each recommended media presentation to the pre-existing list of pre-existing media presentations, each recommended media presentation added to the pre-existing list of pre-existing media presentations in a position determined based user preferences to form an updated list of media presentations;

automatically select, based on the position of each of the media presentations, a selected media presentation to play on the peer device from the updated list of media presentations; and play the selected media presentation on the peer device.

15. The peer device of claim 14 wherein the identifier comprises a Globally Unique Identifier (GUID).

16. The peer device of claim 15 wherein the control system is adapted to:

compare the GUID from each of the plurality of media recommendations to GUIDs for a plurality of locally stored media presentations to determine whether each of the plurality of media presentations is stored locally by the peer device; and obtain at least one of the plurality of media presentations that is not stored locally from a remote content source.

17. The peer device of claim 15 wherein the control system is adapted to:

compare the GUID from each of the plurality of media recommendations to GUIDs for a plurality of locally stored media presentations to determine whether each of the plurality of media presentations is stored locally by the peer device; and obtain a preview for at least one of the plurality of media presentations that is not stored locally.

18. The peer device of claim 14 wherein the control system is adapted to:

filter the plurality of media recommendations to provide filtered media recommendations; and automatically select the media presentation to play from a group of media presentations including the media presentations identified by the filtered media recommendations.

19. The peer device of claim 14 wherein the communication interface communicatively couples the peer device to a central server and is adapted to receive the plurality of media recommendations from the plurality of recommending peer devices via a central server.

20. A non-transitory computer readable medium comprising program instructions for:

storing, on a peer device, a pre-existing list of media presentations including a plurality of pre-existing media presentations;

receiving, by the peer device, a plurality of media recommendations sent from a plurality of recommending peer devices in response to a media presentation identified by the media recommendation being played on one of the plurality of recommending peer devices, wherein each of the plurality of media recommendations comprises an identifier that identifies a recommended media presentation;

automatically adding each recommended media presentation to the pre-existing list of pre-existing media presentations, each recommended media presentation added to the pre-existing list of pre-existing media presentations in a position determined based user preferences to form an updated list of media presentations;

automatically selecting, based on the position of each of the media presentations, a selected media presentation to play on the peer device from the updated list of media presentations; and playing the selected media presentation on the peer device.

* * * * *